US010321056B2

United States Patent
Ito et al.

(10) Patent No.: US 10,321,056 B2
(45) Date of Patent: Jun. 11, 2019

(54) IMAGING SYSTEM, IMAGING APPARATUS, INFORMATION PROCESSING APPARATUS, AND INFORMATION PROCESSING METHOD

(71) Applicant: SONY CORPORATION, Tokyo (JP)

(72) Inventors: Ryogo Ito, Tokyo (JP); Kazuma Akamatsu, Tokyo (JP); Shunsuke Katsumata, Kanagawa (JP); Shiro Eshita, Tokyo (JP); Megumi Takagi, Kanagawa (JP); Ayumi Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 186 days.

(21) Appl. No.: 15/026,816

(22) PCT Filed: Sep. 25, 2014

(86) PCT No.: PCT/JP2014/075415
§ 371 (c)(1),
(2) Date: Apr. 1, 2016

(87) PCT Pub. No.: WO2015/076015
PCT Pub. Date: May 28, 2015

(65) Prior Publication Data
US 2016/0309088 A1    Oct. 20, 2016

(30) Foreign Application Priority Data
Nov. 19, 2013  (JP) .................................. 2013-238426

(51) Int. Cl.
*H04N 5/77*  (2006.01)
*G03B 17/02*  (2006.01)
(Continued)

(52) U.S. Cl.
CPC ......... *H04N 5/23245* (2013.01); *G03B 17/02* (2013.01); *H04N 5/2257* (2013.01);
(Continued)

(58) Field of Classification Search
CPC ........... H04N 5/23245; H04N 5/23293; H04N 5/23206; H04N 5/772; H04N 5/2257;
(Continued)

(56) References Cited

U.S. PATENT DOCUMENTS 7,508,442 B2 *  3/2009  Watanabe .............. H04N 5/232
                                                              348/360
7,636,518 B2 * 12/2009  Tanaka .................... G03B 17/14
                                                              348/211.14
(Continued)

FOREIGN PATENT DOCUMENTS

JP    11-112860 A     4/1999
JP   2004-080519 A    3/2004
(Continued)

OTHER PUBLICATIONS

Extended European Search Report of EP Patent Application No. 14864689.6, dated Apr. 12, 2017, 08 pages.
(Continued)

*Primary Examiner* — Pritham D Prabhakher
(74) *Attorney, Agent, or Firm* — Chip Law Group

(57) ABSTRACT

A control unit 15 is provided at an imaging system 10. The control unit 15 controls a mode relating to imaging of an imaging apparatus according to fixation relationship information indicating fixation relationship between the imaging apparatus and an information processing apparatus in a fixation state in which the imaging apparatus and the information processing apparatus are fixed to each other. For example, a fixation relationship determining unit 92 of the imaging apparatus 20 determines the fixation relationship
(Continued)

between the imaging apparatus 20 and the information processing apparatus 60 based on the fixation relationship information, and a control unit 45 controls the mode relating to imaging of the imaging apparatus 20 based on the determination result. Alternatively, a fixation relationship determining unit 92 of the information processing apparatus 60 determines the fixation relationship between the imaging apparatus 20 and the information processing apparatus 60 based on the fixation relationship information, and a control unit 85 controls the mode relating to imaging of the imaging apparatus 20 based on the determination result. It is possible to easily set the mode relating to imaging.

23 Claims, 16 Drawing Sheets

(51) Int. Cl.
  *H04N 5/225* (2006.01)
  *H04N 5/232* (2006.01)
(52) U.S. Cl.
  CPC ..... *H04N 5/23206* (2013.01); *H04N 5/23293* (2013.01); *H04N 5/772* (2013.01)
(58) Field of Classification Search
  CPC .. H04N 5/2254; H04N 5/23209; H04N 5/907; H04N 5/2171; H04N 5/2251; H04N 2201/0084; G03B 17/00; G03B 17/02; G03B 17/12; G03B 17/14; G03B 29/00; H04W 76/10
  USPC ...................................................... 348/220.1
  See application file for complete search history.

(56) References Cited

U.S. PATENT DOCUMENTS

| | | | | |
|---|---|---|---|---|
| 7,801,439 | B2* | 9/2010 | Nagata | G03B 17/12 396/301 |
| 7,957,765 | B1* | 6/2011 | Causey | H04M 1/0256 455/550.1 |
| 8,274,574 | B2* | 9/2012 | Suzuki | H04N 5/232 348/220.1 |
| 8,704,944 | B1* | 4/2014 | Wierzoch | H04N 5/2251 348/207.99 |
| 9,568,806 | B2* | 2/2017 | Kim | H04N 5/2254 |
| 2007/0166027 | A1* | 7/2007 | Misawa | G03B 17/02 396/529 |
| 2007/0279511 | A1* | 12/2007 | Misawa | H04N 5/2251 348/333.06 |
| 2008/0024632 | A1* | 1/2008 | Otsuka | H04N 1/00209 348/294 |
| 2011/0216166 | A1* | 9/2011 | Takahashi | H04N 13/20 348/46 |
| 2013/0141640 | A1* | 6/2013 | Kim | H04N 5/2254 348/375 |
| 2014/0132781 | A1* | 5/2014 | Adams | H04N 5/2254 348/207.1 |

FOREIGN PATENT DOCUMENTS

| | | |
|---|---|---|
| JP | 2004-80519 A | 3/2004 |
| JP | 2004-254185 A | 9/2004 |
| JP | 2007-129316 A | 5/2007 |
| JP | 2007-312297 A | 11/2007 |
| JP | 2008-131555 | 6/2008 |
| JP | 2012-186524 A | 9/2012 |

OTHER PUBLICATIONS

Office Action for CN Patent Application No. 201480062015.9, dated Aug. 1, 2018, 06 pages of Office Action and 10 pages of English Translation.
Office Action for JP Patent Application No. 2015-549027, dated Oct. 16, 2018, 07 pages of Office Action and 12 pages of English Translation.
International Search Report received for PCT Application No. PCT/JP2014/075415, dated Dec. 22, 2014, 2 pages.
Written Opinion received for PCT Application No. PCT/JP2014/075415, dated Dec. 22, 2014, 8 pages.
International Preliminary Report received for PCT Application No. PCT/JP2014/075415, dated May 24, 2016, 6 pages.

* cited by examiner

FIG. 2
(A) 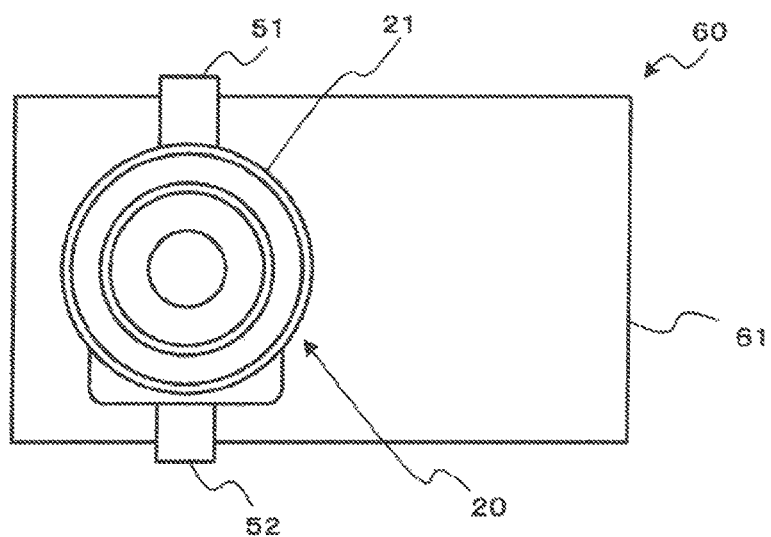
(B) 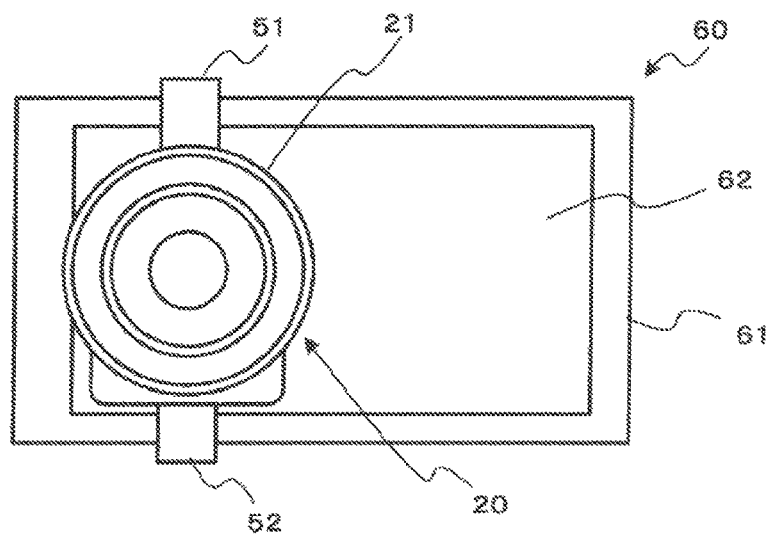

FIG. 4
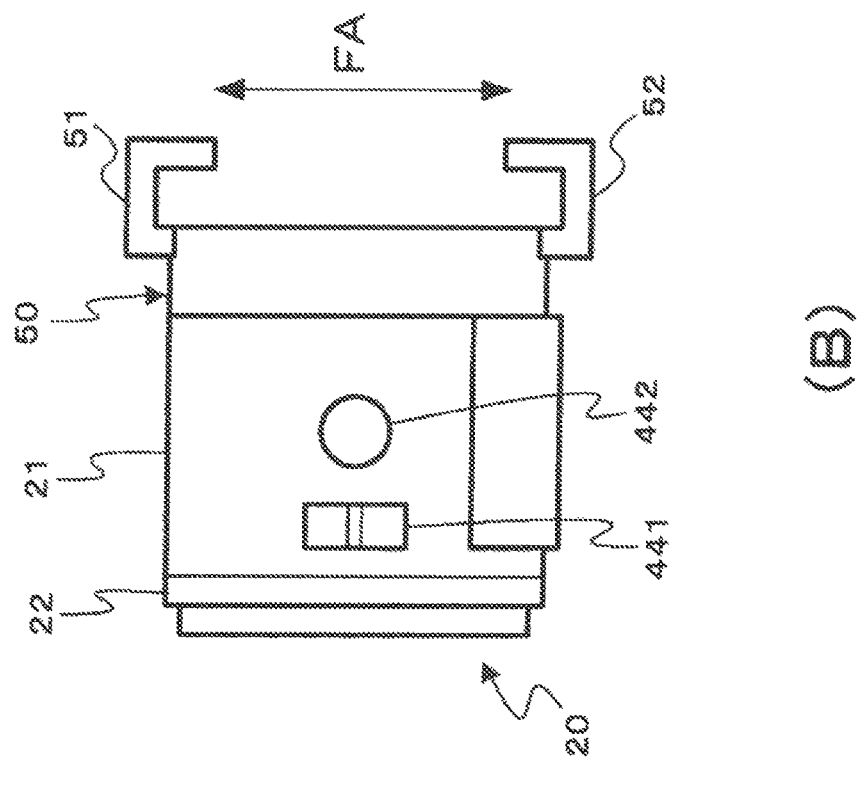
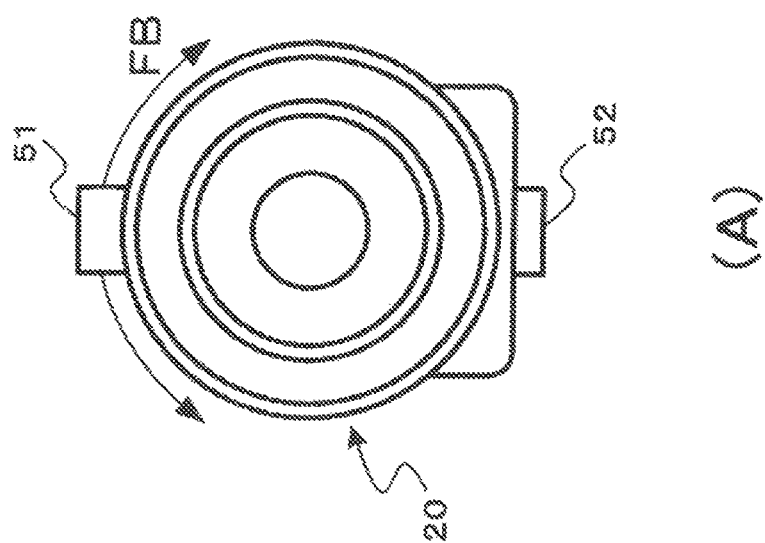

FIG. 10
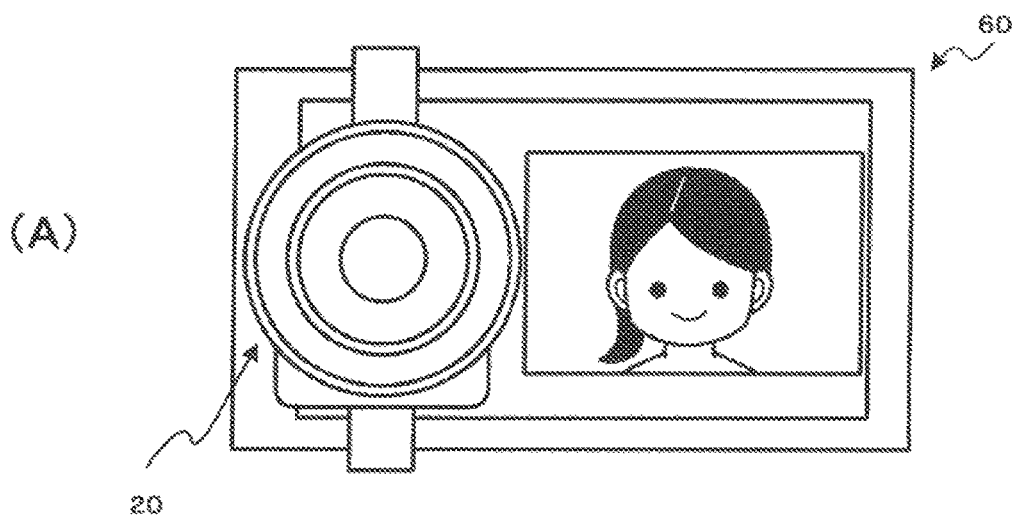
(A)
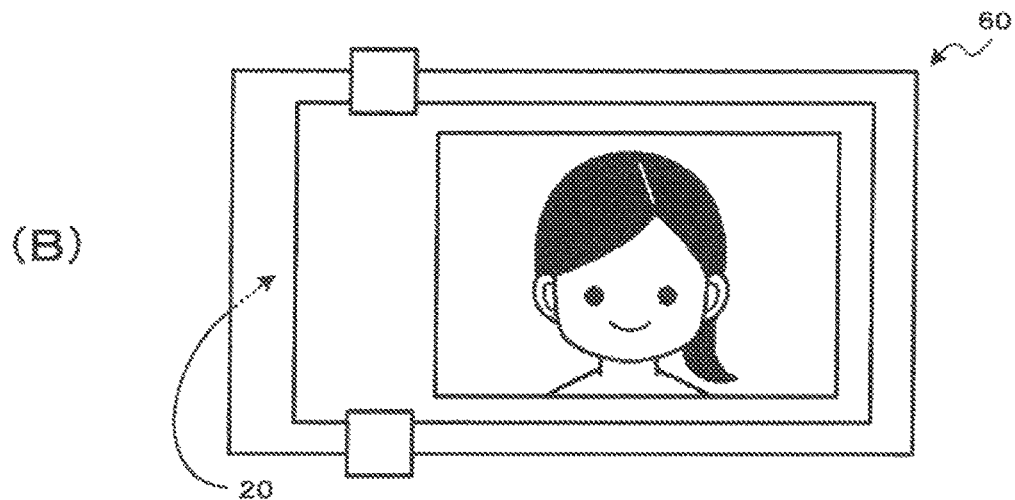
(B)

IMAGING SYSTEM, IMAGING APPARATUS, INFORMATION PROCESSING APPARATUS, AND INFORMATION PROCESSING METHOD

TECHNICAL FIELD

The present technology relates to an imaging system, an imaging apparatus, an information processing apparatus and method, and a program, and enables a mode relating to imaging to be easily set.

BACKGROUND ART

In related art, an imaging apparatus such as a digital still camera and a digital video camera which picks up an image of a subject to generate image data and records this image data as content has been spread. Further, in accordance with spread of an information processing apparatus (such as, for example, a smartphone) which exchanges various kinds of data by utilizing radio communication, it has been proposed to remotely and wirelessly operate an imaging apparatus from a distant location using the information processing apparatus (see, for example, Patent Literature 1).

CITATION LIST

Patent Literature

Patent Literature 1: JP 2012-186698A

SUMMARY OF INVENTION

Technical Problem

By the way, when a mode relating to imaging of an imaging apparatus is set, a user is required to perform troublesome operation for, for example, setting a mode to a desired mode at the imaging apparatus or at an information processing apparatus connected through communication. Therefore, it is desirable to easily set the mode of the imaging apparatus to the desired mode.

Therefore, there is a need for providing an imaging system, an imaging apparatus, an information processing apparatus and method, and a program which enable a mode relating to imaging to be easily set.

Solution to Problem

A first aspect of the present technology resides in an imaging system including: a control unit configured to control a mode relating to imaging of an imaging apparatus according to fixation relationship information indicating fixation relationship between the imaging apparatus and an information processing apparatus in a fixation state in which the imaging apparatus and the information processing apparatus are fixed to each other.

In the imaging system according to the present technology, the imaging apparatus which, for example, does not have a function for displaying a picked up image communicates with the information processing apparatus which has an image display function, so that a picked up image generated at the imaging apparatus is displayed at a display unit of the information processing apparatus. The imaging apparatus and the information processing apparatus are switchable between a fixation state in which the imaging apparatus and the information processing apparatus are fixed to each other and a separation state in which the imaging apparatus and the information processing apparatus are separated from each other, and a fixation/separation determining unit determines whether the imaging apparatus and the information processing apparatus are in the fixation state or the separation state. Further, fixation relationship in the fixation state is determined by a fixation relationship determining unit, and a mode relating to imaging of the imaging apparatus is controlled according to fixation relationship information indicating a determination result of the fixation relationship.

A display unit is provided on one face of a chassis of the information processing apparatus, and when the fixation relationship information indicates that the imaging apparatus is fixed on the side of the display unit of the information processing apparatus, the mode of the imaging apparatus is controlled to be a self-capturing mode. Further, in the self-capturing mode, a picked up image which is mirror-reversed is displayed at the display unit of the information processing apparatus.

Further the mode of the imaging apparatus is controlled to be different between in the case where the fixation relationship information indicates that the imaging apparatus is fixed in a first fixation state to the information processing apparatus and in the case where the imaging apparatus is fixed in a second fixation state in which the imaging apparatus is rotated from the first fixation state by a predetermined angle, for example, approximately 90 degrees or approximately 180 degrees based on an optical axis direction of an optical imaging system of the imaging apparatus. For example, the modes which are different from each other include a still image pickup mode and a moving image pickup mode. Further, the modes which are different from each other may include a still image pickup mode in which a still image is generated according to an imaging scene, a still image pickup mode in which a still image is generated from continuously picked up images, a landscape mode and a portrait mode.

Furthermore, when the fixation relationship information indicates that a plurality of the imaging apparatuses are held on one face of a chassis of the information processing apparatus, modes of the imaging apparatuses are controlled to modes for generating picked up images with viewpoints different among the plurality of imaging apparatuses.

A second aspect of the present technology resides in an imaging system including: a control unit configured to perform control of suggesting to a user that it is preferable to transition to a mode relating to specific imaging of the imaging apparatus according to fixation relationship information indicating fixation relationship between the imaging apparatus and an information processing apparatus in a fixation state in which the imaging apparatus and the information processing apparatus are fixed to each other.

A third aspect of the present technology resides in an imaging control method including: a step of controlling a mode relating to imaging of an imaging apparatus according to fixation relationship information indicating fixation relationship between the imaging apparatus and an information processing apparatus in a fixation state in which the imaging apparatus and the information processing apparatus are fixed to each other.

A fourth aspect of the present technology resides in a program causing a computer to execute control of a mode relating to imaging of an imaging apparatus, the program causing the computer to execute: a procedure of controlling a mode relating to imaging of the imaging apparatus according to fixation relationship information indicating fixation relationship between the imaging apparatus and an information processing apparatus in a fixation state in which the imaging apparatus and the information processing apparatus are fixed to each other.

It should be noted that the program according to the present technology is a program which can be provided to, for example, a general-purpose computer which can execute various program codes using a storage medium which provides the program in a computer-readable form, a communication medium, for example, a storage medium such as an optical disc, a magnetic disc and a semiconductor memory, or a communication medium such as a network. By providing such a program in a computer-readable form, processing according to the program can be implemented on the computer.

A fifth aspect of the present technology resides in an imaging apparatus including: a control unit configured to control a mode relating to imaging according to fixation relationship information indicating fixation relationship with an information processing apparatus in a fixation state in which the imaging apparatus is fixed to the information processing apparatus.

A sixth aspect of the present technology resides in an information processing apparatus including: a communication unit configured to communicate with an imaging apparatus; and a control unit configured to control a mode relating to imaging of an imaging apparatus via the communication unit according to fixation relationship information indicating fixation relationship with the imaging apparatus in a fixation state in which the information processing apparatus is fixed to the imaging apparatus.

Advantageous Effects of Invention

According to the present technology, a mode relating to imaging of an imaging apparatus is controlled according to fixation relationship information indicating fixation relationship between the imaging apparatus and an information processing apparatus in a fixation state in which the imaging apparatus and the information processing apparatus are fixed to each other. Therefore, because the mode is set according to the fixation relationship information without troublesome operation for setting a mode being performed at the imaging apparatus or the information processing apparatus, it is possible to easily set the mode relating to imaging. It should be noted that the advantageous effects described in the present specification are described merely as examples and not by way of limitation, and may include additional advantageous effects.

BRIEF DESCRIPTION OF DRAWINGS

FIG. 2 is a diagram illustrating appearance of the imaging system.

FIG. 4 is a diagram illustrating appearance of an imaging apparatus.

FIG. 10 is a diagram illustrating an operation state of the imaging system.

DESCRIPTION OF EMBODIMENTS

An embodiment for implementing the present technology will be described below. It should be noted that the description will be provided in the following order.
1. Functional Configuration of Imaging System
2. Appearance of Imaging System
3. Functional Configuration of Imaging apparatus
4. Functional Configuration of Information Processing Apparatus
5. Operation of Imaging System
5-1. Collaboration between Imaging Apparatus and Information Processing Apparatus
5-2. Operation of Controlling Mode Relating to Imaging
5-2-1. First Control Operation
5-2-2. Second Control Operation
5-2-3. Third Control Operation <1. Functional Configuration of Imaging System>

Figure 1:
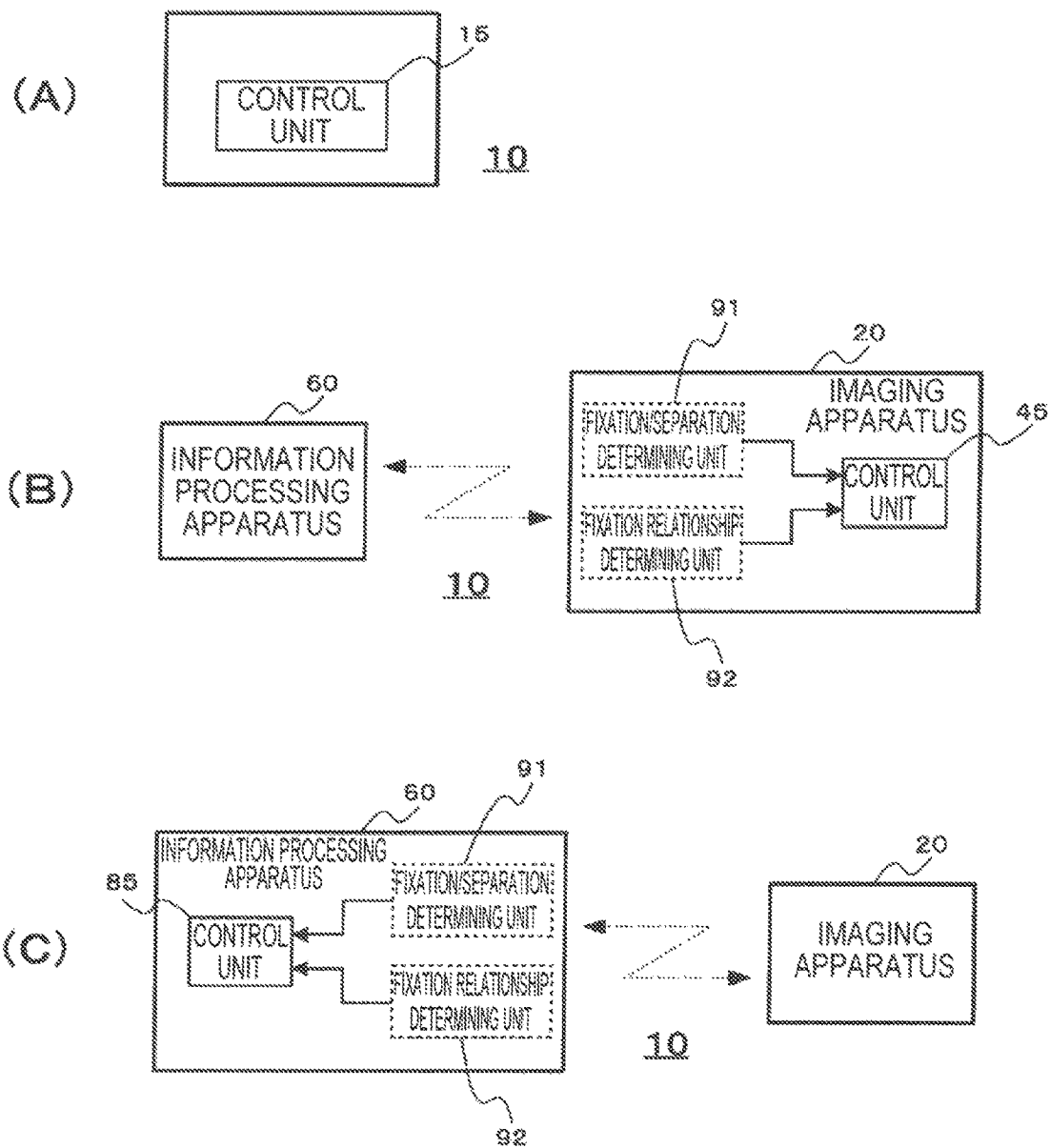
FIG. 1 is a diagram illustrating a functional configuration of an imaging system.

FIG. 1 illustrates a functional configuration of an imaging system 10 according to the present technology. The imaging system 10 includes a control unit 15 as illustrated in FIG. 1(A). The control unit 15 has a function of controlling a mode relating to imaging of an imaging apparatus according to fixation relationship information indicating fixation relationship between the imaging apparatus and an information processing apparatus in a fixation state in which the imaging apparatus and the information processing apparatus are fixed to each other. In the imaging system 10, the control unit 15 may be provided at the imaging apparatus or may be provided at the information processing apparatus. Further, the control unit 15 may be provided at an adapter used for fixing the imaging apparatus and the information processing apparatus to each other. For example, FIG. 1(B) illustrates the imaging system 10 in the case where a control unit 45 which controls operation of the imaging apparatus 20 has a function of controlling the mode relating to imaging. Further, for example, FIG. 1(C) illustrates the imaging system 10 in the case where a control unit 85 which controls operation of the information processing apparatus 60 has a function of controlling the mode relating to imaging. It should be noted that the imaging system 10 illustrated in FIG. 1(A) corresponds to an imaging control apparatus having a function of controlling the mode relating to imaging, while the imaging system 10 illustrated in FIG. 1(B) corresponds to a case where the imaging control apparatus is provided at the imaging apparatus 20. Further, the imaging system 10 illustrated in FIG. 1(C) corresponds to a case where the imaging control apparatus is provided at the information processing apparatus 60.

Further, at the imaging system, a fixation/separation determining unit configured to determine whether the imaging apparatus and the information processing apparatus are in a fixation state or a separation state and output fixation/separation information may be provided. For example, as illustrated in FIG. 1(B), a fixation/separation determining unit 91 may be provided at the imaging apparatus 20, or, as illustrated in FIG. 1(C), the fixation/separation determining unit 91 may be provided at the information processing apparatus 60. Further, at the imaging system, a fixation relationship determining unit configured to determine fixation relationship between the imaging apparatus and the information processing apparatus and output fixation relationship information may be provided. For example, as illustrated in FIG. 1(B), a fixation relationship determining unit 92 may be provided at the imaging apparatus 20, or, as illustrated in FIG. 1(C), the fixation relationship determining unit 92 may be provided at the information processing apparatus 60. Further, although not illustrated, the fixation/separation determining unit 91 and the fixation relationship determining unit 92 may be provided at the adapter used for fixing the imaging apparatus and the information processing apparatus to each other. Further, the fixation/separation determining unit 91 and the fixation relationship determining unit 92 may be provided at an apparatus different from an apparatus having a control unit which has a function of controlling a mode. For example, as in the imaging system 10 illustrated in FIG. 1(B), when the control unit 45 of the imaging apparatus 20 has a function of controlling a mode, the fixation/separation determining unit 91 may be provided at the information processing apparatus 60. Further, although not illustrated, the control unit, the fixation/separation determining unit and the fixation relationship determining unit may be provided separately from the imaging apparatus 20 and the information processing apparatus 60.

The imaging apparatus 20 is configured to be able to select a plurality of modes so as to be able to easily generate, for example, a desired picked up image (a still image or a moving image). Further, the imaging apparatus 20 has a communication function. The imaging apparatus 20 communicates various kinds of information with the information processing apparatus 60 through, for example, radio communication. Further, while the imaging apparatus 20 does not have a function of displaying a picked up image generated through imaging, the imaging apparatus 20 transmits image information of the picked up image to the information processing apparatus, so that the picked up image is displayed at the information processing apparatus. Further, the imaging apparatus 20 can perform control of a mode relating to imaging, or the like, based on a control signal supplied from the information processing apparatus 60 through communication.

The information processing apparatus 60 is equipment having a display function and a communication function, and, for example, a mobile phone, a smartphone, a tablet terminal, a laptop computer, or the like, can be used as the information processing apparatus. The information processing apparatus 60 processes information supplied from the imaging apparatus 20 through, for example, radio communication. For example, the information processing apparatus 60 displays a picked up image based on image information supplied from the imaging apparatus 20. Further, when the information processing apparatus 60 performs control of a mode relating to imaging at the imaging apparatus 20, or the like, the information processing apparatus 60 generates a control signal for controlling the imaging apparatus 20 and transmits the control signal to the imaging apparatus 20 through communication.

It should be noted that a configuration of the imaging system 10 is not limited to the configuration illustrated in FIG. 1. For example, the imaging system 10 may be the control unit 15 alone, the imaging apparatus 20 alone, the information processing apparatus 60 alone, or a combination thereof.

<2. Appearance of Imaging System>

Figure 3:
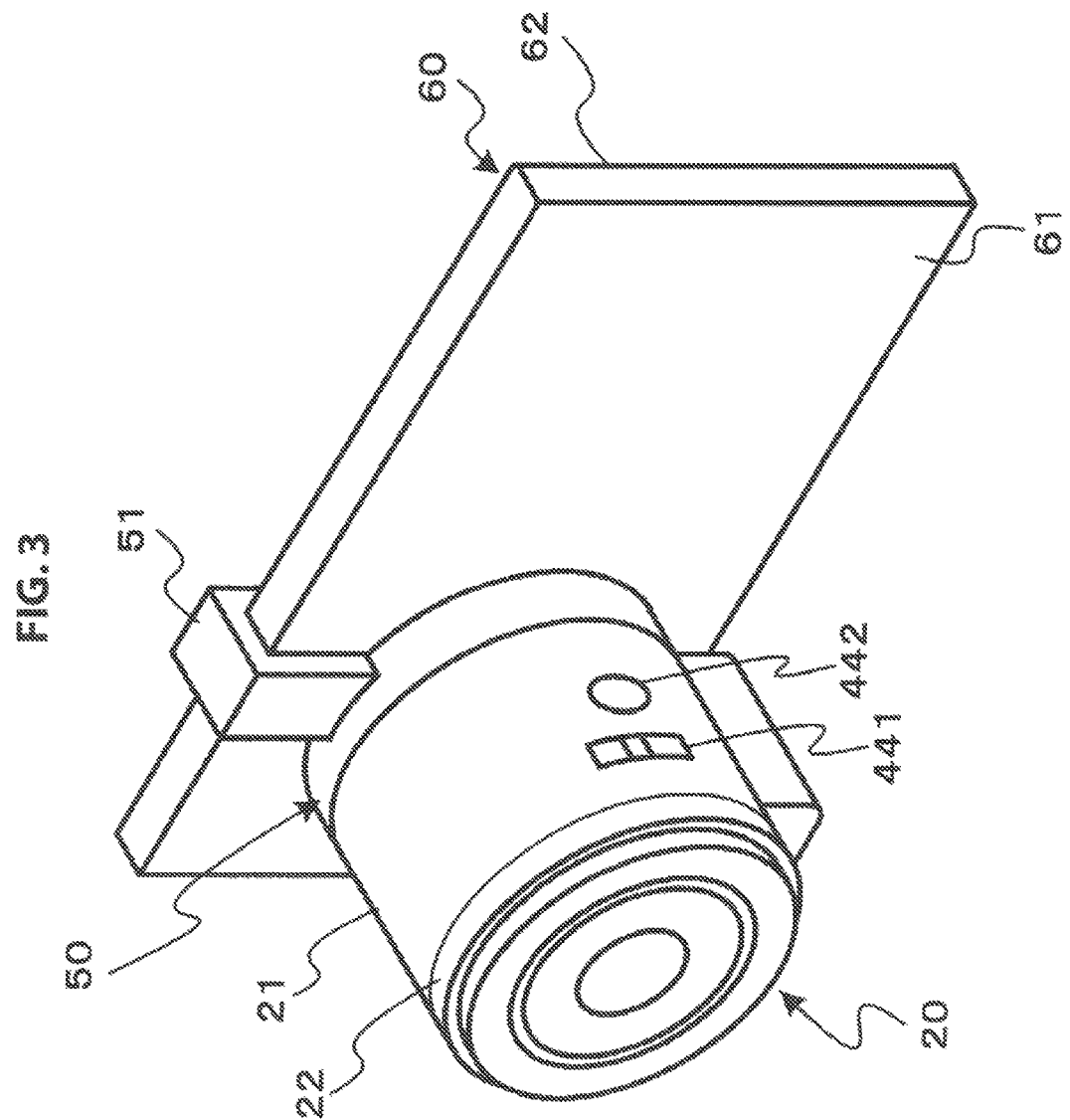
FIG. 3 is a perspective view illustrating the appearance of the imaging system.

FIG. 2 is a diagram illustrating appearance of the imaging system, and FIG. 3 is a perspective view illustrating appearance of the imaging system. FIG. 4 is a diagram illustrating appearance of the imaging apparatus. It should be noted that in FIG. 2 and FIG. 3, for example, a smartphone is used as the information processing apparatus.

Although not illustrated, the imaging apparatus 20 has an optical imaging system, an imaging unit, a signal processing unit, a communication unit, a control unit; or the like, inside a cylindrical portion 21 formed in a cylindrical shape. An annular control ring 22 is provided at an anterior end portion of the cylindrical portion 21. It should be noted that the optical imaging system may be an interchangeable lens. The imaging apparatus 20 changes a focus position or a zoom position in accordance with rotation of the control ring 22. Therefore, by using the control ring 22, it is possible to realize manual operation of focus adjustment, or the like. Further, a zoom button 441 and a shutter button 442 are provided at a side face of the cylindrical portion 21. The imaging apparatus 20 changes the zoom position toward a wide angle side or toward a telephoto side in accordance with operation of the zoom button 441. Further, when the imaging apparatus 20 is put in a still image mode, the imaging apparatus 20 performs processing of recording a still image at the time the shutter button 442 is manipulated by a user in a recording medium. Further, when the imaging apparatus 20 is put in a moving image pickup mode, the imaging apparatus 20 starts or finishes recording of a moving image according to operation of the shutter button 442.

Although not illustrated, the information processing apparatus 60 has a signal processing unit, a communication unit, a control unit, or the like, inside a chassis 61 formed in a chassis form having a substantially rectangular shape. Further, a display panel 62 is provided on one face (front face) of the chassis 61. The display panel 62 is configured using a touch panel, and various kinds of functions are executed by each predetermined position of the display panel 62 being manipulated.

An attachment mechanism portion 50 for integrally attaching the imaging apparatus 20 and the information processing apparatus 60 is provided at the imaging apparatus 20. Attachment members 51 and 52 are provided at the attachment mechanism portion 50, and are configured to be able to move in an arrow FA direction as illustrated in FIG. 4. The user integrally fixes the imaging apparatus 20 to the information processing apparatus 60 by moving the attachment members 51 and 52 in the arrow FA direction according to a shape, a size, or the like, of the information processing apparatus 60 and locking the attachment members 51 and 52 to the chassis 61 of the information processing apparatus 60. It should be noted that FIG. 2(A) illustrates a state in which the imaging apparatus 20 is integrally fixed on a back side of the information processing apparatus 60, while FIG. 2(B) illustrates a state in which the imaging apparatus 20 is integrally fixed on a front side (the display panel 62 side) of the information processing apparatus 60. Further, the user separates the imaging apparatus 20 from the information processing apparatus 60 by moving the attachment members 51 and 52 locked to the chassis 61 of the information processing apparatus 60 in a direction opposite to a locking direction.

Further, the attachment members 51 and 52 are configured to be able to rotate in an arrow FB direction about an optical axis direction of the imaging apparatus 20. Therefore, in the imaging system, it is possible to change a holding state of the imaging apparatus 20 with respect to the information processing apparatus 60.

It should be noted that the configuration of the attachment mechanism portion 50 is not limited to the configuration in which the attachment mechanism portion 50 is integrally configured with the imaging apparatus 20, and the attachment mechanism portion 50 may be configured separately from the imaging apparatus 20 as an adapter for integrally attaching the imaging apparatus 20 and the information processing apparatus 60.

<3. Functional Configuration of Imaging Apparatus>

Figure 5:
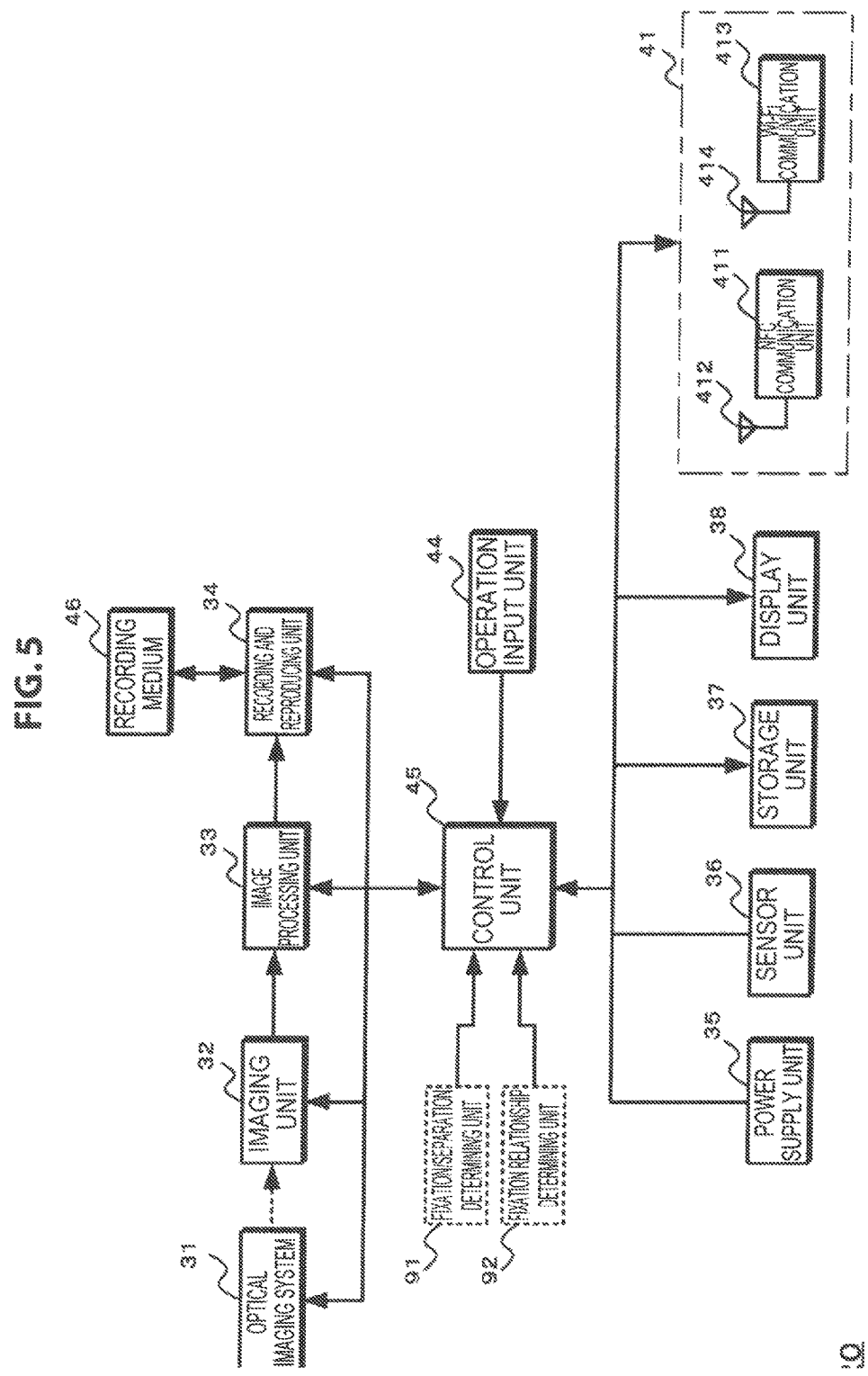
FIG. 5 is a block diagram illustrating a functional configuration of the imaging apparatus.

A functional configuration of the imaging apparatus will be described next. FIG. 5 is a block diagram illustrating the functional configuration of the imaging apparatus.

The imaging apparatus 20 includes an optical imaging system 31, an imaging unit 32, an image processing unit 33, a recording and reproducing unit 34, a power supply unit 35, a sensor unit 36, a storage unit 37, a display unit 38, a radio communication unit 41, an operation input unit 44 and a control unit 45. Further, a recording medium 46 is provided at the imaging apparatus 20. The recording medium 46 may be fixed at the imaging apparatus 20 or may be provided so as to be able to be incorporated into the imaging apparatus 20.

The optical imaging system 31 has a lens group including a focus lens, a zoom lens, or the like, a diaphragm adjusting mechanism, and a driving unit configured to drive the lens group and the diaphragm adjusting mechanism. Further, the optical imaging system 31 may have an optical shutter mechanism, a camera-shake correcting mechanism, or the like.

The imaging unit 32 is configured using an imaging device such as a charge coupled device (CCD) and a complementary metal oxide semiconductor (CMOS). The imaging unit 32 converts a subject optical image formed by the optical imaging system 31 into an image signal. The imaging unit 32 outputs the image signal generated through photoelectric conversion to the image processing unit 33.

The image processing unit 33 performs various kinds of signal processing, or the like, on the image signal outputted from the imaging unit 32. For example, the image processing unit 33 performs noise removal, color compensation, edge detection, or the like, as necessary. The image processing unit 33 outputs the processed image signal to the recording and reproducing unit 34.

The recording and reproducing unit 34 records a picked up image and reproduces the recorded picked up image using the recording medium 46. The recording and reproducing unit 34 records an image signal of a still image or a moving image generated at the imaging unit 32 and processed at the image processing unit 33 in the recording medium 46. Further, the recording and reproducing unit 34 reproduces the still image or the moving image recorded in the recording medium 46 and reads out the image signal. It should be noted that the recording and reproducing unit 34 may record an image signal before being processed at the image processing unit 33 in the recording medium 46. Further, the recording and reproducing unit 34 may perform encoding processing for compressing a signal amount of an image signal to be recorded in the recording medium 46 and processing of decoding encoded data recorded in the recording medium 46.

The power supply unit 35 is configured with a battery and a power supply circuit. The power supply unit 35 supplies power to each unit of the imaging apparatus 20 according to a control signal outputted from the control unit 45.

The sensor unit 36 detects a current location, posture or a posture change, orientation, or the like, of the imaging apparatus 20. The sensor unit 36 is configured using a sensor for detecting the current location, a sensor for detecting the posture or the posture change, and a sensor for detecting the orientation in an imaging direction, or the like, and outputs sensor information indicating detection results to the control unit 45. For example, the sensor unit 36 detects the posture such as inclination of the imaging apparatus 20 with respect to a vertical direction or a horizontal direction, and a position in a rotational direction of the imaging apparatus 20 with respect to a rotational axis which is an optical axis of the optical imaging system 31. Further, the sensor unit 36 detects the posture change, or the like, of the imaging apparatus 20. It should be noted that the sensor unit 36 uses, for example, global positioning system (GPS) positioning module, or the like, as the sensor for detecting the current location. Further, the sensor unit 36 uses, for example, a triaxial acceleration sensor, an inclination sensor, a gyro sensor, or the like as the sensor for detecting the posture or the posture change, and uses, for example, a geomagnetic sensor, or the like, as the sensor for detecting the orientation in the imaging direction. Further, the sensor unit 36 may be configured to detect at least any of the current location, the posture or the posture change, the orientation, or the like, of the imaging apparatus 20.

The storage unit 37 is a recording medium such as a random access memory (RAM) and a read only memory (ROM). The RAM is utilized as, for example, a work area of the control unit 45. Further, for example, a program, or the like, for executing various control at the control unit 45 is stored in the ROM. Further, control information, or the like, used to perform various control at the control unit 45 is stored in the ROM or the RAM.

The display unit 38 is configured using, for example, a liquid crystal display device, or the like, and displays a setting state or an operation state of the imaging apparatus 20.

The radio communication unit 41 includes a near field communication (NFC) communication unit 411, an NFC antenna 412, a Wi-Fi communication unit 413 and a Wi-Fi antenna 414.

The NFC communication unit 411 is an interface for performing non-contact communication with an external apparatus (for example, the information processing apparatus 60) near the imaging apparatus 20 while collaborating with the NFC antenna 412 according to control by the control unit 45. The NFC communication unit 411 transmits a radio wave reaching a short distance of approximately 3 cm to 10 cm or approximately 7 mm depending on design from the NFC antenna 412 to perform NFC communication with the external apparatus included within a radio wave range. The NFC communication unit 411 transmits, for example, connection information (Wi-Fi configuration) for automatically connecting to Wi-Fi and an android application record (AAR) according to a check command from the external apparatus. The connection information includes a service set identifier (SSID) for Wi-Fi connection, a pass key (encryption key), or the like.

The Wi-Fi communication unit 413 is an interface for performing radio communication with an external apparatus (for example, the information processing apparatus 60) around the imaging apparatus 20 while collaborating with the Wi-Fi antenna 414 according to control by the control unit 45. The Wi-Fi communication unit 413 performs processing of establishing Wi-Fi communication connection with the external apparatus by performing Wi-Fi authentication in response to, for example, a Wi-Fi connection request from the external apparatus.

The operation input unit 44 detects operation input by the user and outputs an operation signal according to the user operation to the control unit 45. The operation input unit 44 has the above-described zoom button 441 and shutter button 442, and has a configuration in which functions are assigned in advance to physical switches.

The control unit 45 executes a program recorded in the storage unit 37 and generates a control signal based on the operation signal supplied from the operation input unit 44, control information stored in the storage unit 37, a result of communication with the information processing apparatus 60, the fixation/separation information and the fixation relationship information, sensor information, or the like. The control unit 45 outputs the generated control signal to each unit and performs imaging control, image processing control, recording and reproducing control, or the like, so that the operation according to the user operation is performed at the imaging apparatus 20. Further, the control unit 45 performs processing of transmitting the image information of the picked up image from the radio communication unit 41 to the information processing apparatus 60 or processing of controlling the operation of the imaging apparatus 20 based on the control signal from the information processing apparatus 60.

The recording medium 46 is a memory card, or the like, in which a picked up image, or the like, is written, and is detachably provided.

It should be noted that when the fixation/separation determining unit 91 is provided at the imaging apparatus 20, the fixation/separation information outputted from the fixation/separation determining unit 91 is outputted to the control unit 85 of the information processing apparatus 60 via the control unit 45 or the radio communication unit 41. Further, when the fixation relationship determining unit 92 is provided at the imaging apparatus 20, the fixation relationship information outputted from the fixation relationship determining unit 92 is outputted to the control unit 85 of the information processing apparatus 60 via the control unit 45 or the radio communication unit 41. Further, the processing at the fixation/separation determining unit 91 and the fixation relationship determining unit 92 may be performed at the control unit 45. For example, the control unit 45 transmits the fixation relationship information from the radio communication unit 41 to the information processing apparatus 60 and controls the mode relating to imaging using the control signal supplied from the information processing apparatus 60 in response to transmission of the fixation relationship information.

When the fixation/separation determining unit 91 is provided at the imaging apparatus 20, a switch, or the like, for detecting whether the imaging apparatus 20 and the information processing apparatus 60 are in a fixation state or a separation state is provided at the imaging apparatus 20 as the fixation/separation determining unit 91, and a signal generated by this switch is used as the fixation/separation information. For example, when the imaging apparatus 20 can be separated from the attachment mechanism portion 50, a switch is provided at the imaging apparatus 20 as the fixation/separation determining unit 91, the switch being put into an on-state when the attachment mechanism portion 50 is attached to the imaging apparatus 20 and the attachment mechanism portion 50 is further attached to the information processing apparatus 60, and the switch being put into an off-state when any of the imaging apparatus 20 and the information processing apparatus 60 is separated from the attachment mechanism portion 50. Further, a signal generated by this switch is used as the fixation/separation information.

<4. Functional Configuration of Information Processing Apparatus>

Figure 6:
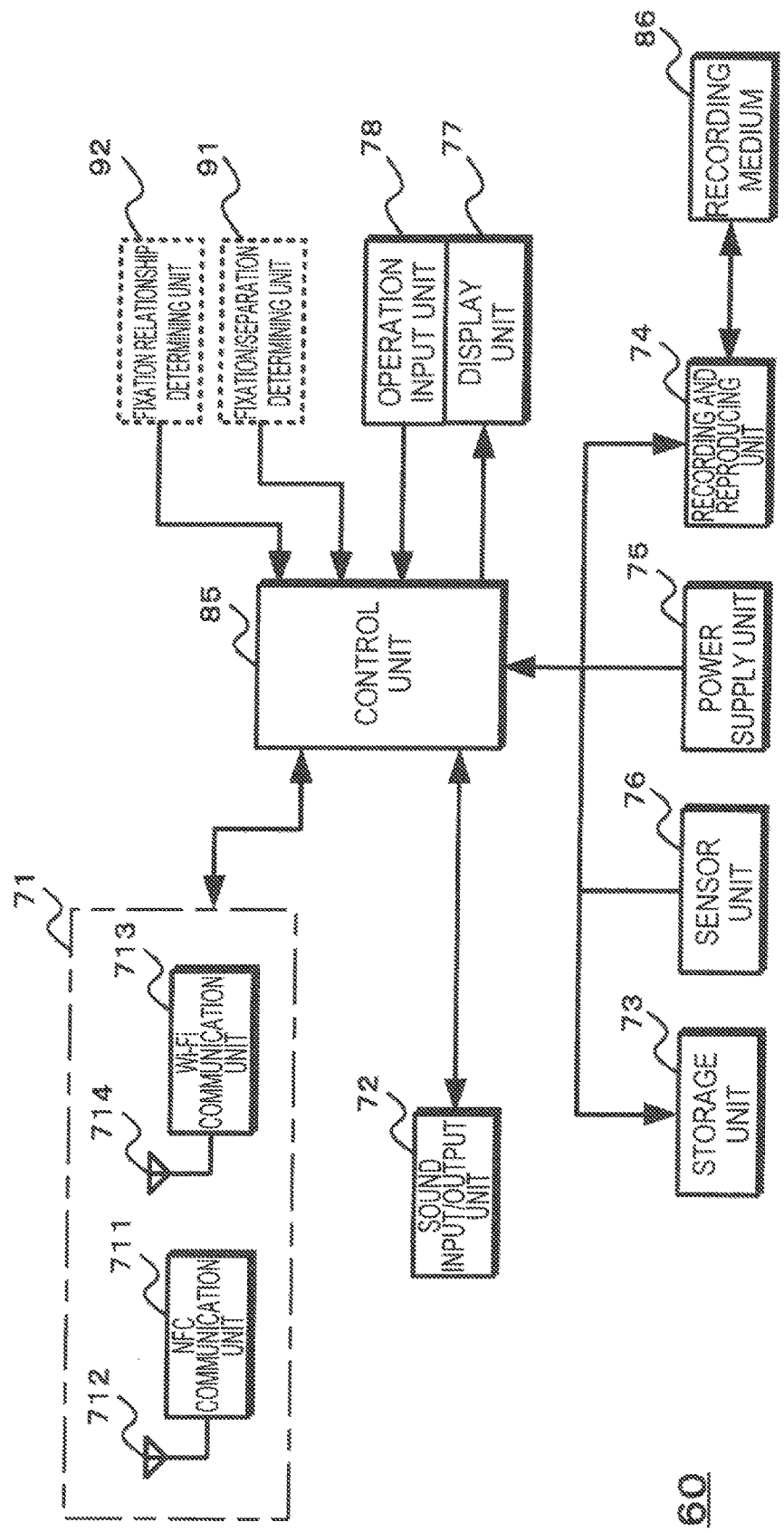
FIG. 6 is a block diagram illustrating a functional configuration of an information processing apparatus (for example, a smartphone).

A functional configuration of the information processing apparatus will be described next. FIG. 6 is a block diagram illustrating the functional configuration of the information processing apparatus (for example, a smartphone).

The information processing apparatus 60 has a radio communication unit 71, a sound input/output unit 72, a storage unit 73, a recording and reproducing unit 74, a power supply unit 75, a sensor unit 76, a display unit 77, an operation input unit 78 and a control unit 85. Further, a recording medium 86 is detachably provided at the information processing apparatus 60.

The radio communication unit 71 includes an NFC communication unit 711, an NFC antenna 712, a Wi-Fi communication unit 713 and a Wi-Fi antenna 714. It should be noted that, although not illustrated, a communication unit complying with communication standards of a cellular phone may be provided at the radio communication unit 71.

The NFC communication unit 711 is an interface performing non-contact communication with an external apparatus (for example, the imaging apparatus 20) near the information processing apparatus 60 while collaborating with the NFC antenna 712. The NFC communication unit 711 performs, for example, NFC communication with the imaging apparatus 20 as described above.

The Wi-Fi communication unit 712 is an interface performing radio communication with an external apparatus (for example, the imaging apparatus 20) around the information processing apparatus 60 while collaborating with the Wi-Fi antenna 714. The Wi-Fi communication unit 713 performs, for example, processing of establishing Wi-Fi communication connection with the imaging apparatus 20 as described above.

The sound input/output unit 72 is configured using a speaker and a microphone. The sound input/output unit 72 inputs/outputs sound of speech conversation performed via the radio communication unit 71. Further, the sound input/output unit 72 outputs reproduced sound of music content or image content recorded in the storage unit 73 or the recording medium 86.

The storage unit 73 is a recording medium such as a random access memory (RAM) and a read only memory (ROM). The RAM is utilized as, for example, a work area of the control unit 85. Further, for example, a program, or the like, for executing various control at the control unit 85 is stored in the ROM. Further, in the ROM and the RAM, control information, or the like, used to perform various control at the control unit 85 is stored. Still further, in the RAM, music content and image content, a program for various kinds of application, a picked up image supplied from the imaging apparatus 20, email information, or the like, can be recorded.

The recording and reproducing unit 74 records various kinds of information and reads out the recorded information using the recording medium 86. The recording and reproducing unit 74 records, for example, music content or image content, a picked up image, email information, address information of others used for radio communication, or the like, in the recording medium 86. Further, the recording and reproducing unit 74 reads out various kinds of information recorded in the recording medium 86.

The power supply unit 75 is configured with a battery and a power supply circuit. The power supply unit 75 supplies power to each unit of the information processing apparatus 60 based on the control signal from the control unit 85.

The sensor unit 76 detects a current location, posture or a posture change, orientation, or the like, of the information processing apparatus 60. The sensor unit 76 is configured using a sensor for detecting the current location, a sensor for detecting the posture or the posture change, and a sensor for detecting the orientation in an imaging direction, or the like, and outputs sensor information indicating detection results to the control unit 85. It should be noted that the sensor unit 76 uses, for example, a global positioning system (GPS) positioning module, or the like, as the sensor for detecting the current location. Further, the sensor unit 76 uses, for example, a triaxial acceleration sensor, an inclination sensor, a gyro sensor, or the like, as the sensor for detecting the posture or the posture change, and uses, for example, a geomagnetic sensor, or the like, as the sensor for detecting the orientation in the imaging direction. Further, the sensor unit 76 may be configured to detect at least any of the current location, the posture or the posture change, the orientation, or the like, of the information processing apparatus 60.

The display unit 77 is configured using a display device such as a liquid crystal display, an organic EL display, or the like. The display unit 77 displays a graphical user interface (GUI) screen, characters, images, or the like, according to operation of application by control of the control unit 85.

The operation input unit 78 is configured using an operation switch and a touch panel. The touch panel is provided on a display screen of the display unit 77, and is configured such that functions are assigned according to display of the display screen. The operation input unit 78 generates an operation signal according to the user operation and outputs the operation signal to the control unit 85. It should be noted that the above-described display panel 62 is configured using, for example, the display unit 77 and the operation input unit 78.

The control unit 85 executes a program recorded in the storage unit 73 and generates a control signal based on the operation signal supplied from the operation input unit 78, the control information stored in the storage unit 73, or the like. The control unit 85 outputs the generated control signal to each unit and performs communication control, display control, recording and reproducing control, or the like, so that operation according to the user operation is performed at the information processing apparatus 60. Further, the control unit 85 controls the NFC communication unit 711 and the Wi-Fi communication unit 713 to perform radio communication with the imaging apparatus 20. Further, the control unit 85 performs processing of starting a predetermined application program based on communication with the imaging apparatus 20 and processing of generating a control signal based on the operation signal, the fixation/separation information, the fixation relationship information, or the like, and transmitting the control signal to the imaging apparatus 20 after the program is started. For example, the control unit 85 performs processing of generating a control signal for controlling a mode relating to imaging of the imaging apparatus 20 according to the fixation relationship information acquired from the imaging apparatus 20 through the radio communication unit 71 and transmitting the control signal to the imaging apparatus 20. Further, the control unit 85 performs processing of displaying the picked up image supplied from the imaging apparatus 20 at the display unit 77, or the like.

It should be noted that when the fixation/separation determining unit 91 is provided at the information processing apparatus 60, the fixation/separation information outputted from the fixation/separation determining unit 91 is outputted to the control unit 45 of the imaging apparatus 20 via the control unit 85 or the radio communication unit 71. Further, when the fixation relationship determining unit 92 is provided at the information processing apparatus 60, the fixation relationship information outputted from the fixation relationship determining unit 92 is outputted to the control unit 45 of the imaging apparatus 20 via the control unit 85 or the radio communication unit 71. Further, the processing at the fixation/separation determining unit 91 and the fixation relationship determining unit 92 may be performed at the control unit 85.

Further, when the fixation/separation determining unit 91 or the fixation relationship determining unit 92 is provided at the adapter for fixing the imaging apparatus 20 and the information processing apparatus 60, the fixation/separation determining unit 91 or the fixation relationship determining unit 92 outputs a determination result to the control unit 45 of the imaging apparatus 20 or the control unit 85 of the information processing apparatus 60.

When the fixation/separation determining unit is provided at the information processing apparatus 60, a detection mechanism or a detection function for detecting whether or not the attachment members 51 and 52 of the attachment mechanism portion 50 attached to the imaging apparatus 20 for fixing the imaging apparatus 20 to the information processing apparatus 60 are locked to the information processing apparatus 60 is provided at the information processing apparatus 60 as the fixation/separation determining unit 91. Further, the fixation/separation determining unit 91 uses the detection result of this detection mechanism, or the like, as the fixation/separation information. It should be noted that a switch may be provided at the information processing apparatus 60 as the detection mechanism, or the detection function may be implemented by utilizing the display panel 62. When the fixation/separation determining unit 91 is provided at the attachment mechanism portion 50 which is an adapter, a detection mechanism for detecting whether or not the attachment members for fixing the attachment mechanism portion 50 to which the imaging apparatus 20 is attached, to the information processing apparatus 60 are locked to the information processing apparatus 60 is provided at the attachment mechanism portion 50 as the fixation/separation detection unit 91. The fixation/separation determining unit 91 uses the detection result of this detection mechanism as the fixation/separation information. Further, because the posture change and movement of the imaging apparatus 20 are the same as the posture change and movement of the information processing apparatus 60 when the imaging apparatus 20 and the information processing apparatus 60 are in a fixation state, it is also possible to generate the fixation/separation information by determining whether the imaging apparatus 20 and the information processing apparatus 60 are in a fixation state or a separation state based on a detection result of the posture change and movement.

<5. Operation of Imaging System>

[5-1. Collaboration between Imaging Apparatus and Information Processing Apparatus]

Figure 7:
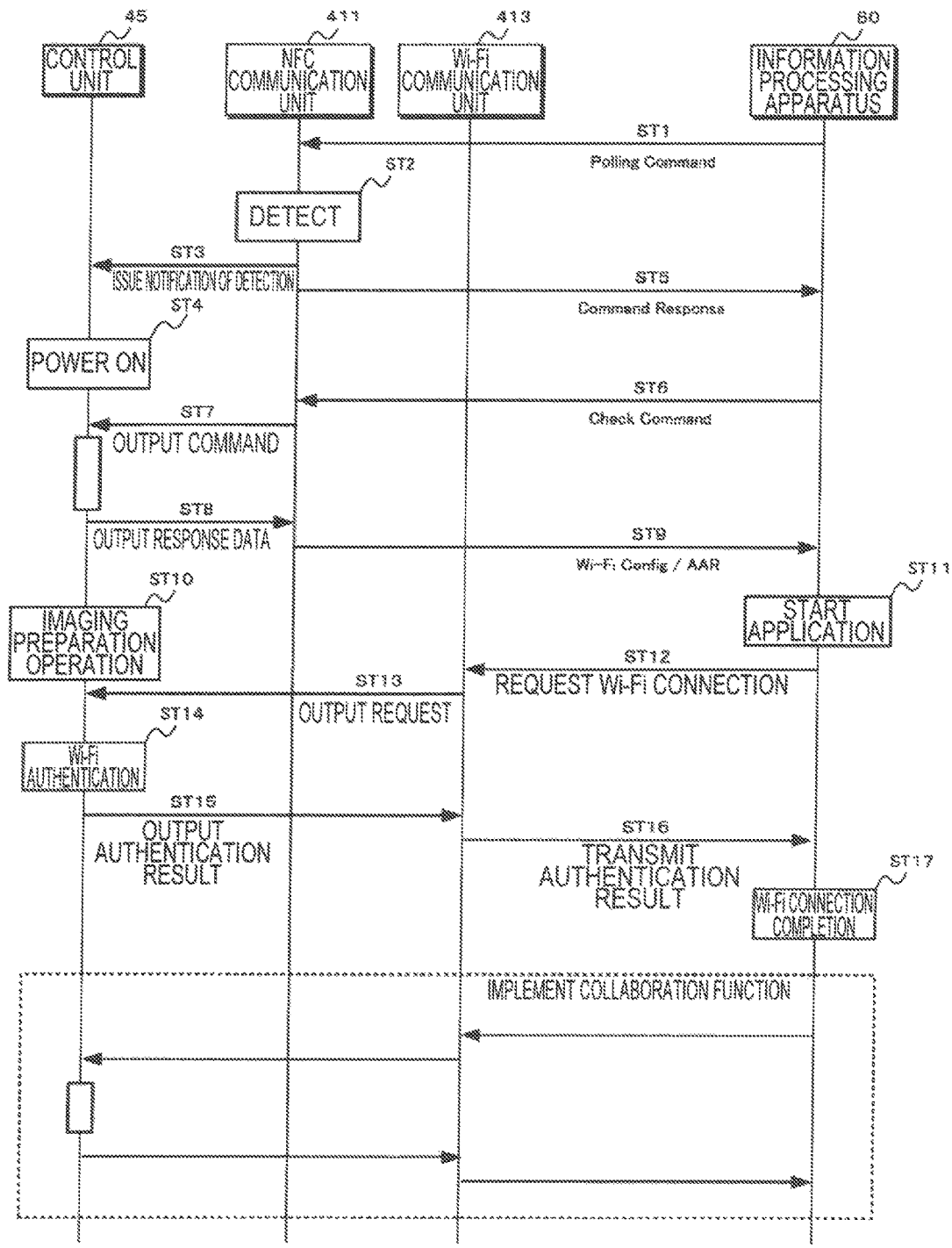
FIG. 7 is a sequence diagram illustrating operation processing until a collaboration function between the imaging apparatus and the information processing apparatus is started.

Operation of the imaging system will be described next. FIG. 7 is a sequence diagram illustrating operation processing until a function of collaboration between the imaging apparatus and the information processing apparatus is started in the imaging system.

In step ST1, the information processing apparatus 60 issues a polling command through NFC communication. Here, when the NFC antenna of the imaging apparatus 20 is included within a predetermined radio wave range from the NFC antenna of the information processing apparatus 60, in step ST2, the NFC communication unit 411 of the imaging apparatus 20 detects issuing of the polling command.

In step ST3, the NFC communication unit 411 of the imaging apparatus 20 notifies the control unit 45 of the detection in response to the detection of the NFC communication from the information processing apparatus 60.

In step ST4, the control unit 45 generates a control signal in response to notification of the detection by the NFC communication unit 411 and outputs the control signal to the power supply unit 35 to perform control of power-on.

In step ST5, the NFC communication unit 411 issues a command response through NFC communication in response to the detection of the NFC communication.

In step ST6, the information processing apparatus 60 finds an NFC communication party by detecting the command response from the imaging apparatus 20 and issues a check command to acquire predetermined information.

In step ST7, the NFC communication unit 411 of the imaging apparatus 20 outputs the check command received through the NFC communication to the control unit 45.

In step ST8, the control unit 45 outputs response data to the NFC communication unit 411 in response to the check command. Here, the response data includes, for example, the above-described Wi-Fi Config and AAR.

In step ST9, the NFC communication unit 411 transmits the response data to the information processing apparatus 60 through NFC communication. It should be noted that the above-described step ST6 to step ST9 may be performed a plurality of times, and a plurality of times of transmission may be performed to transmit the response data divided into a plurality of pieces.

In step ST10, the control unit 45 performs imaging preparation operation. The control unit 45 performs preparation operation so that imaging can be performed the imaging apparatus 20. Further, during the preparation operation, preparation operation which makes it possible to recognize that the imaging apparatus 20 can perform imaging, may be performed. For example, the control unit 45 performs operation of making the lens project when a retractable lens is used as the optical imaging system 31, operation for outputting start-up sound, or the like. It should be noted that the imaging preparation operation may be performed after Wi-Fi connection is completed.

In step ST11, the information processing apparatus 60 starts predetermined application according to the received AAR. For example, in the predetermined application, processing of receiving the image signal of the picked up image transmitted from the imaging apparatus 20 through Wi-Fi communication and displaying the picked up image, or the like, is performed.

In step ST12, the information processing apparatus 60 requests Wi-Fi connection to the imaging apparatus 20 using the received Wi-Fi Config.

In step ST13, the Wi-Fi communication unit 413 of the imaging apparatus 20 outputs the connection request received from the information processing apparatus 60 to the control unit 45.

In step ST14, the control unit 45 performs Wi-Fi authentication. It should be noted that the Wi-Fi authentication may be performed at the Wi-Fi communication unit 413.

In step ST15, the control unit 45 outputs the authentication result to the Wi-Fi communication unit 413.

In step ST16, the Wi-Fi communication unit 413 transmits the authentication result to the information processing apparatus 60. In step ST17, the information processing apparatus 60 completes Wi-Fi connection by successful authentication. Then, the imaging apparatus 20 and the information processing apparatus 60 implement a collaboration function using Wi-Fi communication.

It should be noted that the imaging apparatus 20 and the information processing apparatus 60 only have to collaborate with each other through Wi-Fi communication, or the like, and processing until the function of collaboration between the imaging apparatus and the information processing apparatus is implemented is not limited to processing in the order illustrated in FIG. 7.

[5-2. Operation of Controlling Mode Relating to Imaging]

Operation of controlling a mode relating to imaging will be described next. After the imaging apparatus 20 or the information processing apparatus 60 implements the collaboration function, the mode relating to imaging of the imaging apparatus 20 is controlled according to the fixation relationship information indicating fixation relationship between the imaging apparatus 20 and the information processing apparatus 60 in a fixation state in which the imaging apparatus 20 and the information processing apparatus 60 are fixed to each other. Further, when the imaging apparatus 20 is separated from the information processing apparatus 60, control of the mode relating to imaging of the imaging apparatus 20 is not performed according to the fixation relationship information. Still further, in the control of the mode relating to imaging, it is also possible to select a mode among modes preset by the user according to the fixation relationship information. It should be noted that the modes preset by the user may be modes selected by the user among modes registered in advance upon shipment from the factory or modes uniquely set by the user.

The fixation relationship information indicating the fixation state of the imaging apparatus 20 and the information processing apparatus 60 is generated at the imaging apparatus 20, the attachment mechanism portion 50 or the information processing apparatus 60. For example, the imaging apparatus 20, the attachment mechanism portion 50 or the information processing apparatus 60 generates information indicating on which of a front side and a back side of the information processing apparatus 60, the imaging apparatus 20 is fixed as the fixation relationship information. When the imaging apparatus 20 generates the fixation relationship information, for example, a brightness detection sensor is provided at a fixed face side of the imaging apparatus 20 as the fixation relationship determining unit 92. Here, when the fixed face side of the imaging apparatus 20 is firmly attached to the back side of the information processing apparatus 60, the fixed face side is maintained in a dark state. Further, when the fixed face side of the imaging apparatus 20 is firmly attached to the front side of the information processing apparatus 60, brightness of the fixed face side changes according to luminance of an image displayed at the display panel 62. Therefore, when the display unit 77 is provided at the information processing apparatus 60, and the imaging apparatus 20 and the information processing apparatus 60 collaborate with each other, the information processing apparatus 60 sets brightness of a display area corresponding to a position of the brightness detection sensor to predetermined brightness. By this means, it is possible to generate the fixation relationship information indicating on which of the front side and the back side of the information processing apparatus 60, the imaging apparatus 20 is fixed based on the detection result of the brightness detection sensor. When the fixation relationship information is generated at the information processing apparatus 60, for example, the attachment members 51 and 52 are configured to abut on the display panel 62 of the information processing apparatus 60 when the imaging apparatus 20 is fixed on the back side of the information processing apparatus 60. Here, if the display panel 62 is configured with a display unit and the touch panel as will be described later, it is possible to detect abutment of the attachment members 51 and 52 using the touch panel. Therefore, when the display unit 77 is provided at the information processing apparatus 60, and the imaging apparatus 20 and the information processing apparatus 60 collaborate with each other, the information processing apparatus 60 uses the touch panel as the fixation relationship determining unit 92. By this means, it is possible to generate the fixation relationship information indicating on which of the front side and the back side of the information processing apparatus 60, the imaging apparatus 20 is fixed based on the detection result of the touch panel. In this manner, when the display unit 77 is provided, the control unit 85 of the information processing apparatus 60 performs, for example, control of luminance of the screen, processing of the detection result of the touch panel, or the like, so that the fixation relationship information indicates on which of the front side and the back side of the information processing apparatus 60, the imaging apparatus 20 is fixed. Further, when the fixation relationship information is generated at the attachment mechanism portion 50, it is also possible to make, for example, a shape, or the like, different between a front side and a back side at a side end portion of the information processing apparatus 60 and detect this difference of the shape, or the like, using the attachment members 51 and 52, or the like. With this configuration, it is possible to generate the fixation relationship information indicating on which of the front side and the back side of the information processing apparatus 60, the imaging apparatus 20 is fixed based on the detection result.

Further, the fixation relationship information indicating the fixation relationship between the imaging apparatus 20 and the information processing apparatus 60 may be information indicating a rotational position of the imaging apparatus 20 fixed at the information processing apparatus 60 with respect to the information processing apparatus 60 based on an optical axis direction of the optical imaging system of the imaging apparatus 20. In this case, for example, a detection mechanism for detecting positions of the attachment members 51 and 52 in a rotational direction based on the optical axis direction of the optical imaging system of the imaging apparatus 20 is provided at the imaging apparatus 20 or the attachment mechanism portion 50. By providing such a detection mechanism, when the imaging apparatus 20 is fixed at the information processing apparatus 60 via the attachment mechanism portion 50, because a detection result of the detection mechanism indicates fixation relationship between the imaging apparatus 20 and the information processing apparatus 60, the detection result can be used as the fixation relationship information. Further, when the attachment members 51 and 52 are attached to the imaging apparatus 20 in such a manner that the attachment members 51 and 52 cannot rotate based on the optical axis direction of the optical imaging system of the imaging apparatus 20, the detection mechanism detects on which side face of the information processing apparatus 60 the attachment members 51 and 52 are locked. By this means, because the detection result of the detection mechanism indicates the fixation relationship between the imaging apparatus 20 and the information processing apparatus 60, the detection result can be used as the fixation relationship information.

It should be noted that because posture change and movement of the imaging apparatus 20 are the same as posture change and movement of the information processing apparatus 60 when the imaging apparatus 20 and the information processing apparatus 60 are in the fixation state, the fixation relationship information may be generated by determining the fixation relationship between the imaging apparatus 20 and the information processing apparatus 60 based on the detection results of the posture change and the movement.

[5-2-1. First Control Operation]

First control operation of a mode relating to imaging will be described next. In the first control operation, a case will be described where when the imaging apparatus and the information processing apparatus are put into a fixation state, control of the mode relating to imaging is performed according to the fixation relationship between the imaging apparatus and the information processing apparatus, for example, on which of the front side and the back side of the information processing apparatus the imaging apparatus is fixed.

When the user picks up an image of a desired subject located in front of the user, as illustrated in FIG. 2(A), the imaging apparatus 20 is integrally fixed on the back side of the information processing apparatus 60. By this means, it is possible to easily confirm how the image of the desired subject located in front of the user is picked up through an image displayed at the display unit 77 (display panel 62) of the information processing apparatus 60. Further, when the user picks up an image of him/herself as a subject (in the case of self-capturing), as illustrated in FIG. 2(B), the imaging apparatus 20 is integrally fixed on the front side of the information processing apparatus 60. Further, the user holds the imaging apparatus 20 so as to be able to confirm the image displayed at the display unit 77 (display panel 62). By holding the imaging apparatus 20 in this manner, the user can easily confirm how an image of him/herself is picked up through an image displayed at the display unit 77 (display panel 62) of the information processing apparatus 60. In this manner, when an image is picked up while the imaging apparatus 20 is integrally held on the front side of the information processing apparatus 60, an imaging direction of the imaging apparatus is similar to a direction the picked up image is displayed at the information processing apparatus 60. Therefore, in order to move an imaging range of the picked up image displayed at the information processing apparatus 60 in a right direction, the user has to move the imaging apparatus 20 or the imaging direction of the imaging apparatus 20 in a left direction. Therefore, when the imaging apparatus is integrally held on the front side of the information processing apparatus 60, the imaging apparatus 20 or the information processing apparatus 60 shifts the mode relating to imaging to a self-capturing mode in which the picked up image which is mirror-reversed is displayed. In this manner, in the self-capturing mode, because the picked up image which is mirror-reversed is displayed, a direction of movement of the imaging range of the picked up image displayed at the information processing apparatus 60 is the same as a direction of movement of the imaging apparatus 20 or the imaging direction of the imaging apparatus 20 (hereinafter, referred to as "movement of the imaging apparatus 20, or the like").

Figure 8:
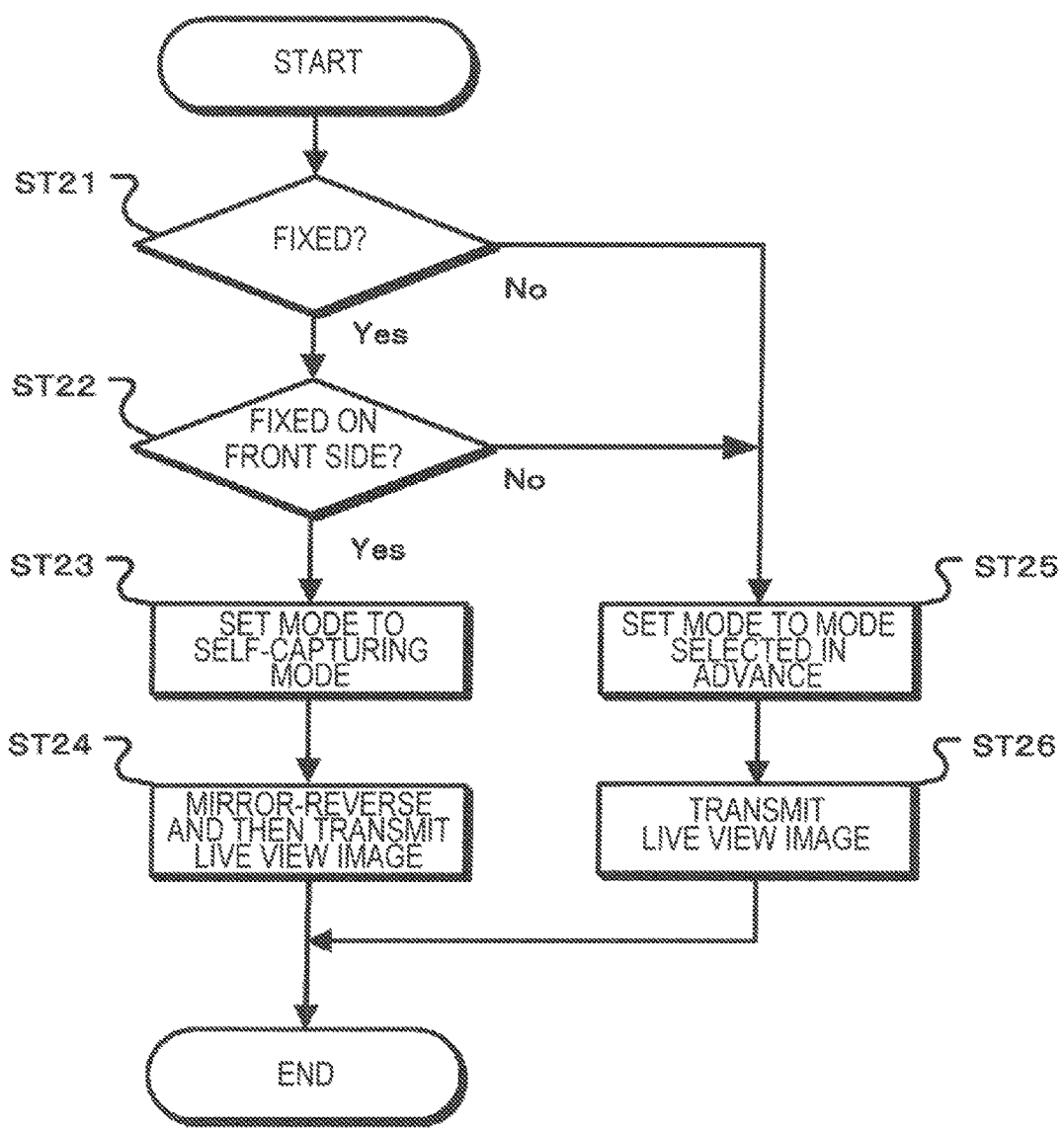
FIG. 8 is a flowchart illustrating processing in the case where first control operation is performed at a control unit of the imaging apparatus.

FIG. 8 is a flowchart illustrating processing in the case where the first control operation is performed at the control unit of the imaging apparatus.

In step ST21, the control unit 45 determines whether the imaging apparatus 20 and the information processing apparatus 60 are fixed. When the control unit 45 determines that the imaging apparatus 20 and the information processing apparatus 60 are fixed based on the fixation/separation information outputted from the fixation/separation determining unit 91, the processing proceeds to step ST22, while, when the control unit 45 determines that the imaging apparatus 20 and the information processing apparatus 60 are in a separation state, the processing proceeds to step ST25.

In step ST22, the control unit 45 determines whether the imaging apparatus 20 is fixed on the front side of the information processing apparatus 60. When the control unit 45 determines that the imaging apparatus 20 is fixed on the front side of the information processing apparatus 60 based on the fixation relationship information outputted from the fixation relationship determining unit 92, the processing proceeds to step ST23, while, when the control unit 45 determines that the imaging apparatus 20 is fixed on a face different from the front side, the processing proceeds to step ST25.

In step ST23, the control unit 45 sets the mode relating to imaging to the self-capturing mode. In the self-capturing mode which is a mode for picking up an image of the user him/herself, the subject is in the proximity of the imaging apparatus. Therefore, for example, when the zoom position is at a telephoto side, an image of only part of the face is picked up, and it is difficult to confirm the whole. Therefore, the control unit 45 moves the zoom position to a wide angle side, for example, a wide angle side end portion when the mode is set at the self-capturing mode. Further, because, the self-capturing mode is a mode for picking up an image of the user him/herself, the control unit 45 performs control appropriate for imaging of a person. Still further, the control unit 45 controls the image processing unit 33 to perform image processing so that, for example, the skin looks beautiful. The control unit 45 sets the mode relating to imaging to the self-capturing mode, and the processing proceeds to step ST24.

In step ST24, the control unit 45 mirror-reverses the live view image and transmits the mirror-reversed live view image. In the case of the self-capturing mode, the imaging direction of the imaging apparatus 20 is similar to the direction the picked up image is displayed at the information processing apparatus 60. Therefore, the control unit 45 mirror-reverses the live view image so that movement of an imaging range of the picked up image displayed at the information processing apparatus 60 is in the same direction as that of movement of the imaging apparatus 20, and transmits the mirror-reversed live view image from the radio communication unit 41 to the information processing apparatus 60. It should be noted that, as will be described later, when the information processing apparatus 60 instructs the imaging apparatus 20 to set the mode to the self-capturing mode, the live view image may be mirror-reversed and then transmitted from the radio communication unit 41 to the information processing apparatus 60 based on this setting instruction. Further, when the picked up image is recorded in the recording medium 46 at the recording and reproducing unit 34 of the imaging apparatus 20, and, when the picked up image is recorded in the recording medium 86 at the recording and reproducing unit 74 of the information processing apparatus 60, the recording and reproducing units 34 and 74 record images which are not mirror-reversed.

When the processing proceeds from step ST21 or step ST22 to step ST25, the control unit 45 sets the mode relating to imaging to a mode selected in advance through user operation. The control unit 45 sets the mode relating to imaging to the mode selected in advance, for example, a mode selected upon completion of previous operation or a mode selected through user operation at the operation input units 44 and 78, and the processing proceeds to step ST26.

In step ST26, the control unit 45 transmits the live view image. The control unit 45 transmits the live view image from the radio communication unit 41 to the information processing apparatus 60 without mirror-reversing the image.

Figure 9:
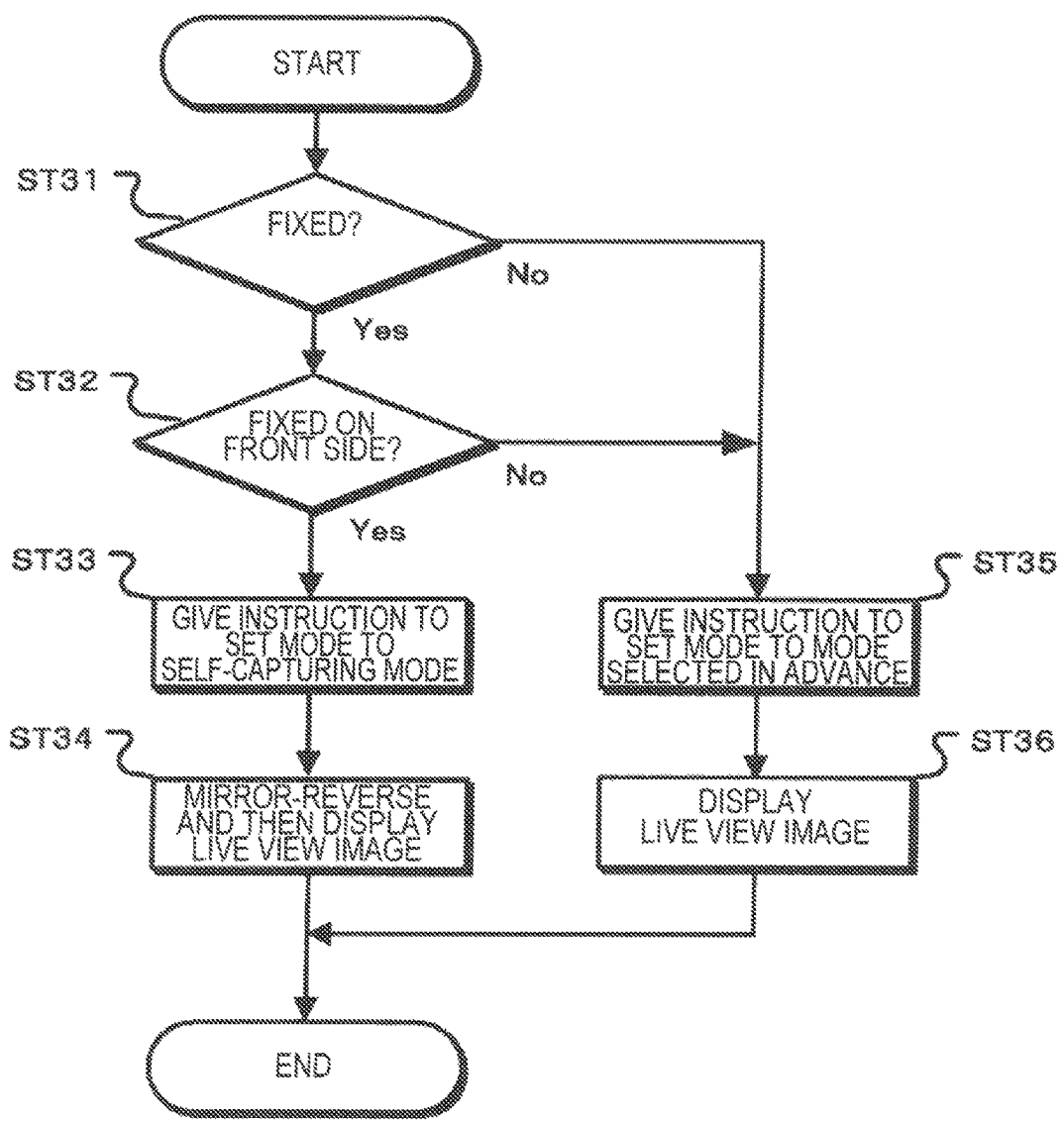
FIG. 9 is a flowchart illustrating processing in the case where the first control operation is performed at a control unit of the information processing apparatus.

FIG. 9 is a flowchart illustrating processing in the case where the first control operation is performed at the control unit of the information processing apparatus.

In step ST31, the control unit 85 determines whether the imaging apparatus 20 and the information processing apparatus 60 are fixed. When the control unit 85 determines that the imaging apparatus 20 and the information processing apparatus 60 are fixed based on the fixation/separation information outputted from the fixation/separation determining unit 91, the processing proceeds to step ST32, while, when the control unit 85 determines that the imaging apparatus 20 and the information processing apparatus 60 are in a separation state, the processing proceeds to step ST35.

In step ST32, the control unit 85 determines whether the imaging apparatus 20 is fixed on the front side of the information processing apparatus 60. When the control unit 85 determines that the imaging apparatus 20 is fixed on the front side of the information processing apparatus 60 based on the fixation relationship information outputted from the fixation relationship determining unit 92, the processing proceeds to step ST33, while, when the control unit 85 determines that the imaging apparatus 20 is fixed on a face different from the front side, the processing proceeds to step ST35.

In step ST33, the control unit 85 gives an instruction to set the mode to the self-capturing mode. The control unit 85 instructs the imaging apparatus 20 to set the mode to the self-capturing mode via the radio communication unit 71, and the processing proceeds to step ST34. It should be noted that the control unit 45 of the imaging apparatus 20 sets the mode relating to imaging to the self-capturing mode as described above based on the instruction to set the mode to the self-capturing mode.

In step ST34, the control unit 85 mirror-reverses the live view image and displays the mirror-reversed live view image. In the case of the self-capturing mode, the imaging direction of the imaging apparatus 20 is similar to the direction the picked up image is displayed at the information processing apparatus 60. Therefore, the control unit 85 mirror-reverses the live view image and displays the mirror-reversed live view image at the display unit 77 so that movement of the imaging range of the picked up image displayed at the information processing apparatus 60 is in the same direction as that of movement of the imaging apparatus 20. It should be noted that when the control unit 85 instructs the imaging apparatus 20 to set the mode to the self-capturing mode as described above and makes the imaging apparatus 20 transmit the mirror-reversed live view image, the live view image from the imaging apparatus 20 is displayed at the display unit 77 without mirror-reversing the image.

When the processing proceeds from step ST31 or step ST32 to step ST35, the control unit 85 gives an instruction to set the mode to the mode selected in advance. The control unit 85 instructs the imaging apparatus 20 to set the mode to the mode selected in advance via the radio communication unit 71, and the processing proceeds to step ST36. It should be noted that the control unit 45 of the imaging apparatus 20 sets the mode relating to imaging to, for example, the mode upon completion of previous operation or the mode selected through user operation at the operation input units 44 and 78.

In step ST36, the control unit 85 displays the live view image. The control unit 85 displays the live view image at the display unit 77 without mirror-reversing the live view image.

FIG. 10 illustrates an operation state of the imaging system. It should be noted that FIG. 10(A) illustrates a case where the imaging apparatus 20 is fixed on the front side of the information processing apparatus 60, and FIG. 10(B) illustrates a case where the imaging apparatus 20 is fixed on the back side of the information processing apparatus 60. When the imaging apparatus 20 is fixed on the back side of the information processing apparatus 60, the live view image is displayed in a similar manner to the imaging apparatus in related art having a function of displaying a picked up image. Further, when the imaging apparatus 20 is fixed on the front side of the information processing apparatus 60, the mode is set to the self-capturing mode, and the live view image which is mirror-reversed is displayed. Therefore, the live view image displayed at the information processing apparatus 60 is similar to the image of him/herself in the mirror, so that it is possible to easily perform setting of the imaging range, or the like.

In this manner, in the first control operation, when the imaging apparatus 20 is fixed on the front side of the information processing apparatus 60, the mode is automatically set to the self-capturing mode. Therefore, the user does not have to perform setting operation to set the mode relating to imaging to the self-capturing mode after fixing the imaging apparatus 20 on the front side of the information processing apparatus 60, and can easily set the mode to a desired mode.

By the way in the above-described first control operation, a case has been described where when the imaging apparatus 20 is fixed on the front side of the information processing apparatus 60, the mode is automatically set to the self-capturing mode. However, control of the mode relating to imaging is not limited to control in which the mode is automatically set, and the mode may transition after a transition instruction is received from the user.

Figure 11:
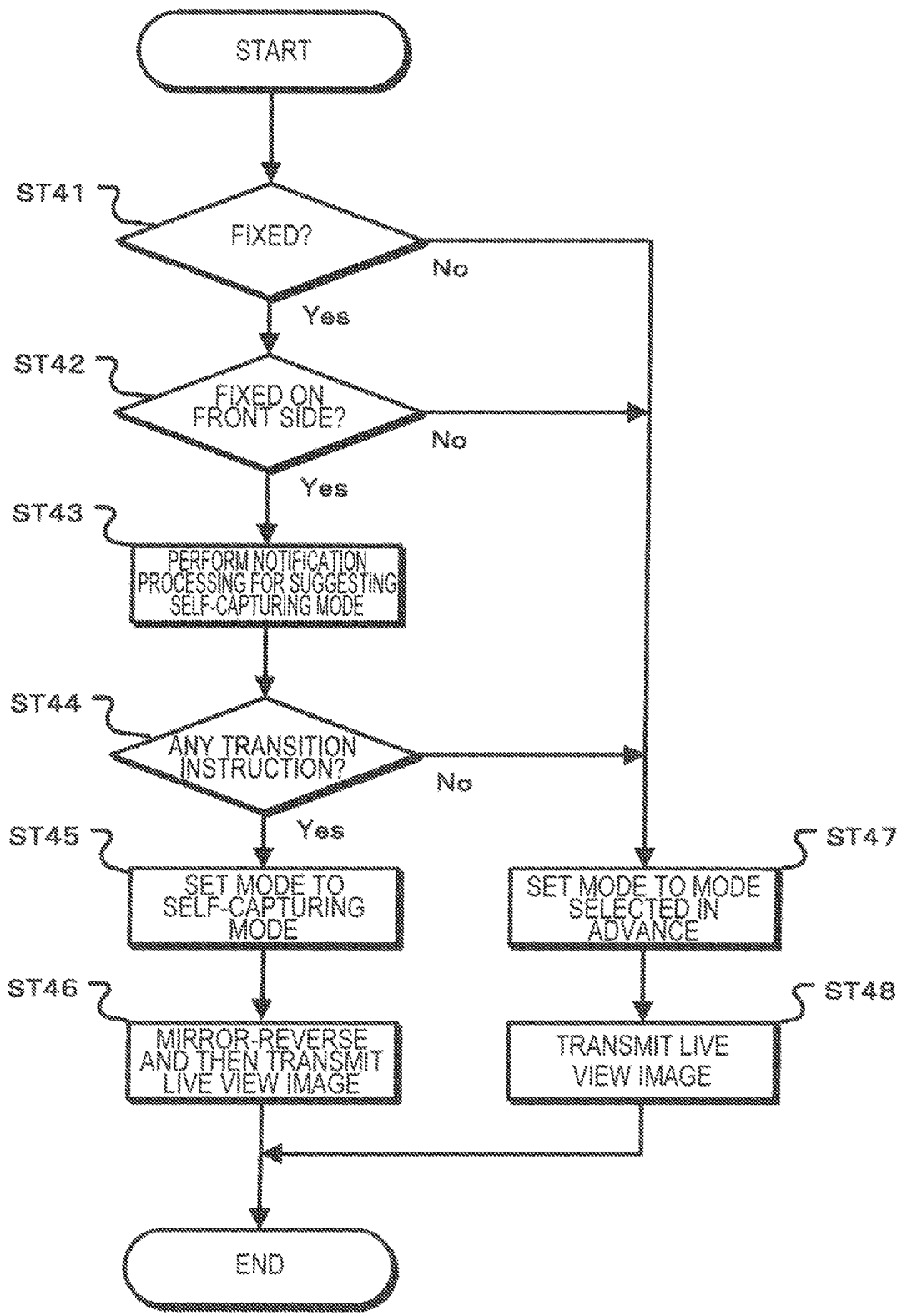
FIG. 11 is a flowchart illustrating another processing in the case where the first control operation is performed at the control unit of the imaging apparatus.

FIG. 11 is a flowchart illustrating another processing in the case where the first control operation is performed at the control unit of the imaging apparatus.

In step ST41, the control unit 45 determines whether the imaging apparatus 20 and the information processing apparatus 60 are fixed. When the control unit 45 determines that the imaging apparatus 20 and the information processing apparatus 60 are fixed based on the fixation/separation information outputted from the fixation/separation determining unit 91, the processing proceeds to step ST42, while, when the control unit 45 determines that the imaging apparatus 20 and the information processing apparatus 60 are in a separation state, the processing proceeds to step ST47.

In step ST42, the control unit 45 determines whether the imaging apparatus 20 is fixed on the front side of the information processing apparatus 60. When the control unit 45 determines that the imaging apparatus 20 is fixed on the front side of the information processing apparatus 60 based on the fixation relationship information outputted from the fixation relationship determining unit 92, the processing proceeds to step ST43, while, when the control unit 45 determines that the imaging apparatus 20 is fixed on a face different from the front side, the processing proceeds to step ST47.

In step ST43, the control unit 45 performs notification processing for suggesting a self-capturing mode. The control unit 45 transmits the suggestion information indicating that it is preferable that the mode relating to imaging transitions to the self-capturing mode to the information processing apparatus 60 via the radio communication unit 41, and the processing proceeds to step ST44. The information processing apparatus 60 notifies the user that it is preferable that the mode transitions to the self-capturing mode using, for example, the display unit 77 based on the suggestion information from the imaging apparatus 20.

In step ST44, the control unit 45 determines whether there is a transition instruction. When the control unit 45 determines that there is a transition instruction, the processing proceeds to step ST45, while, when the control unit 45 determines that there is no transition instruction, the processing proceeds to step ST47. For example, when user operation as to whether or not to transition to the self-capturing mode is performed at the operation input unit 78 of the information processing apparatus 60, the control unit 85 generates instruction result information based on the user operation and transmits the instruction result information from the radio communication unit 71 to the imaging apparatus 20. When the control unit 45 of the imaging apparatus 20 determines that the instruction result information indicates the transition instruction, the processing proceeds to step ST45, while, when the control unit 45 determines that the instruction result information does not indicate the transition instruction, the processing proceeds to step ST47. It should be noted that when user operation is not performed in response to the notification even after a predetermined period has elapsed since the user is notified that it is preferable to transition to the self-capturing mode, the instruction result information may be generated on the supposition that, for example, an instruction to transition to the self-capturing mode is given.

In step ST45, the control unit 45 sets the mode relating to imaging to the self-capturing mode, and the processing proceeds to step ST46. The control unit 45 moves the zoom position to the wide angle side, for example, the wide angle side end portion as described above, upon setting the mode to the self-capturing mode. Further, the control unit 45 performs control appropriate for imaging a person or makes the image processing unit 33 perform image processing so that, for example, the skin looks beautiful.

In step ST46, the control unit 45 mirror-reverses the live view image and transmits the mirror-reversed live view image. In the case of the self-capturing mode, the imaging direction of the imaging apparatus 20 is similar to the direction the picked up image is displayed at the information processing apparatus 60. Therefore, the control unit 45 mirror-reverses the live view image and transmits the mirror-reversed live view image from the radio communication unit 41 to the information processing apparatus 60 so that a direction of movement of the imaging range of the picked up image displayed at the information processing apparatus 60 is the same as that of movement of the imaging apparatus 20.

When the processing proceeds from step ST41, 42 or 44 to step ST47, the control unit 45 sets the mode relating to imaging to a mode selected in advance through user operation, or the like. The control unit 45 sets the mode relating to imaging to the mode selected in advance, for example, a mode selected upon completion of previous operation or a mode selected through user operation at the operation input units 44 and 78, and the processing proceeds to step ST48.

In step ST48, the control unit 45 transmits the live view image. The control unit 45 transmits the live view image from the radio communication unit 41 to the information processing apparatus 60 without mirror-reversing the live view image.

Figure 12:
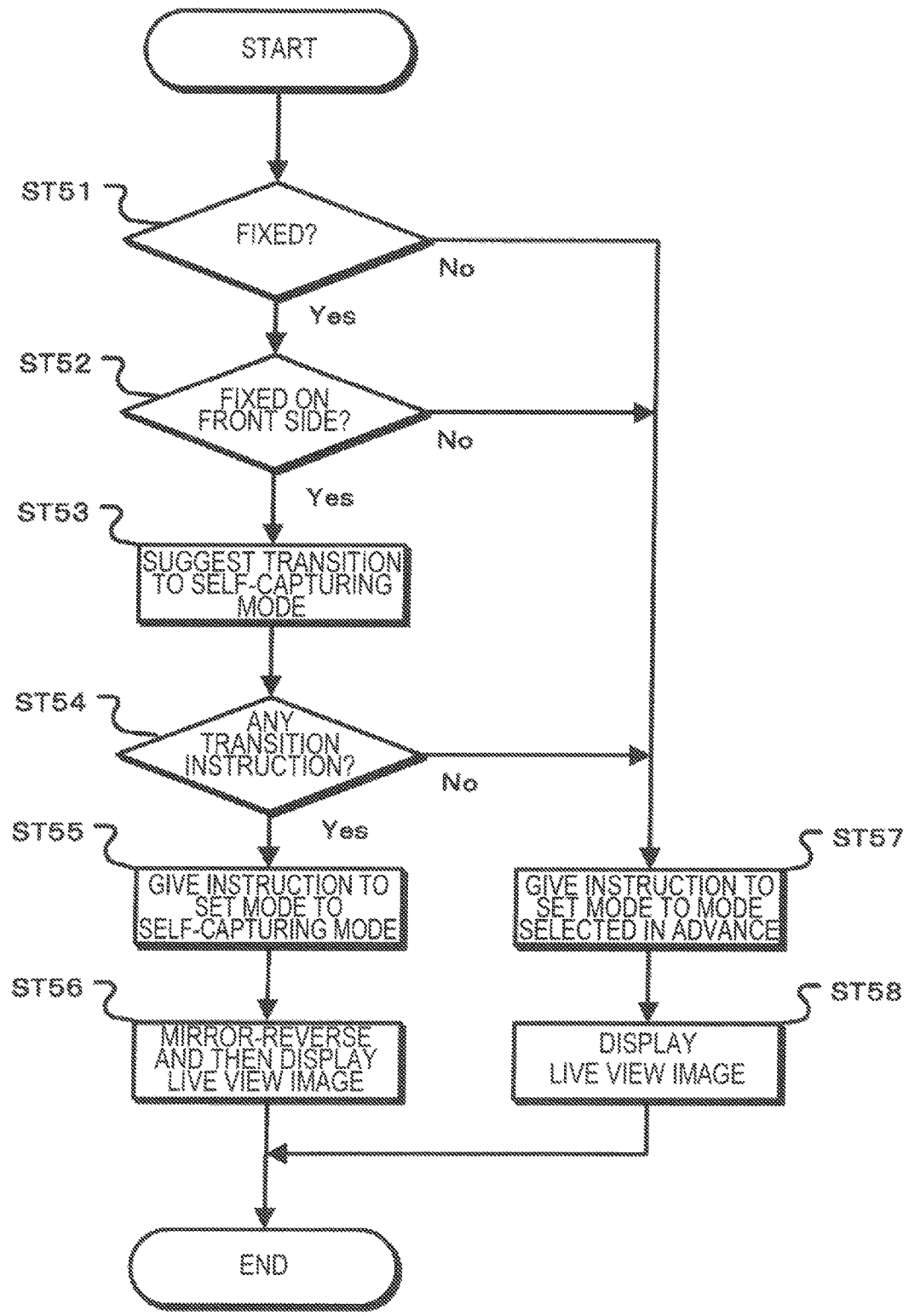
FIG. 12 is a flowchart illustrating another processing in the case where the first control operation is performed at the control unit of the information processing apparatus.

FIG. 12 is a flowchart illustrating another processing in the case where the first control operation is performed at the control unit of the information processing apparatus.

In step ST51, the control unit 85 determines whether the imaging apparatus 20 and the information processing apparatus 60 are fixed. When the control unit 85 determines that the imaging apparatus 20 and the information processing apparatus 60 are fixed based on the fixation/separation information outputted from the fixation/separation determining unit 91, the processing proceeds to step ST52, while, when the control unit 85 determines that the imaging apparatus 20 and the information processing apparatus 60 are in a separation state, the processing proceeds to step ST57.

In step ST52, the control unit 85 determines whether the imaging apparatus 20 is fixed on the front side of the information processing apparatus 60. When the control unit 85 determines that the imaging apparatus 20 is fixed on the front side of the information processing apparatus 60 based on the fixation relationship information outputted from the fixation relationship determining unit 92, the processing proceeds to step ST53, while, when the control unit 85 determines that the imaging apparatus 20 is fixed on a face different from the front side, the processing proceeds to step ST57.

In step ST53, the control unit 85 suggests transition to the self-capturing mode. The control unit 85 notifies the user that it is preferable that the mode relating to imaging transitions to the self-capturing mode using, for example, the display unit 77, and the processing proceeds to step ST54.

In step ST54, the control unit 85 determines whether there is a transition instruction. The control unit 85 determines, for example, whether or not operation for giving an instruction to transition to the self-capturing mode is performed at the operation input unit 78, and, when the operation for giving an instruction to transition is performed, the processing proceeds to step ST55, while, when operation for giving an instruction not to transition is performed, the processing proceeds to step ST57. It should be noted that when the control unit 85 determines that user operation is not performed in response to the notification even after a predetermined period has elapsed since the user is notified that it is preferable to transition to the self-capturing mode, the processing may proceed on the supposition that, for example, an instruction to transition to the self-capturing mode is given.

In step ST55, the control unit 85 gives an instruction to set the mode to the self-capturing mode. The control unit 85 instructs the imaging apparatus 20 to set the mode to the self-capturing mode via the radio communication unit 71, and the processing proceeds to step ST56. It should be noted that the control unit 45 of the imaging apparatus 20 sets the mode relating to imaging to the self-capturing mode as described above based on the instruction to set the mode to the self-capturing mode.

In step ST56, the control unit 85 mirror-reverses the live view image and displays the mirror-reversed live view image. In the case of the self-capturing mode, the imaging direction of the imaging apparatus 20 is similar to the direction the picked up image is displayed at the information processing apparatus 60. Therefore, the control unit 85 mirror-reverses the live view image and displays the mirror-reversed live view image at the display unit 77 so that a direction of movement of the imaging range of the picked up image displayed at the information processing apparatus 60 is the same as that of movement of the imaging apparatus 20.

When the processing proceeds from step ST51, 52 or 54 to step ST57, the control unit 85 gives an instruction to set the mode to a mode selected in advance. The control unit 85 instructs the imaging apparatus 20 to set the mode to the mode selected in advance via the radio communication unit 71, and the processing proceeds to step ST58. It should be noted that the control unit 45 of the imaging apparatus 20 sets the mode relating to imaging to, for example, a mode upon completion of previous operation or a mode set through user operation at the operation input units 44 and 78 based on the instruction to set the mode to the mode selected in advance.

In step ST58, the control unit 85 displays the live view image. The control unit 85 displays the live view image at the display unit 77 without mirror-reversing the live view image.

In this manner, if suggestion that it is preferable to transition to a specific mode relating to imaging of the imaging apparatus is given to the user according to the fixation relationship information indicating the fixation relationship between the imaging apparatus and the information processing apparatus, the user can select the mode relating to imaging while taking into account this suggestion. Further, it is possible to prevent a mode different from a desired mode from being automatically set when the desired mode of the user is different from a preferable mode.

[5-2-2. Second Control Operation]

Second control operation of the mode relating to imaging will be described next. In the second control operation, a case will be described where when the imaging apparatus and the information processing apparatus are put into a fixation state, the mode relating to imaging is controlled according to posture of the imaging apparatus fixed to the information processing apparatus.

Figure 13:
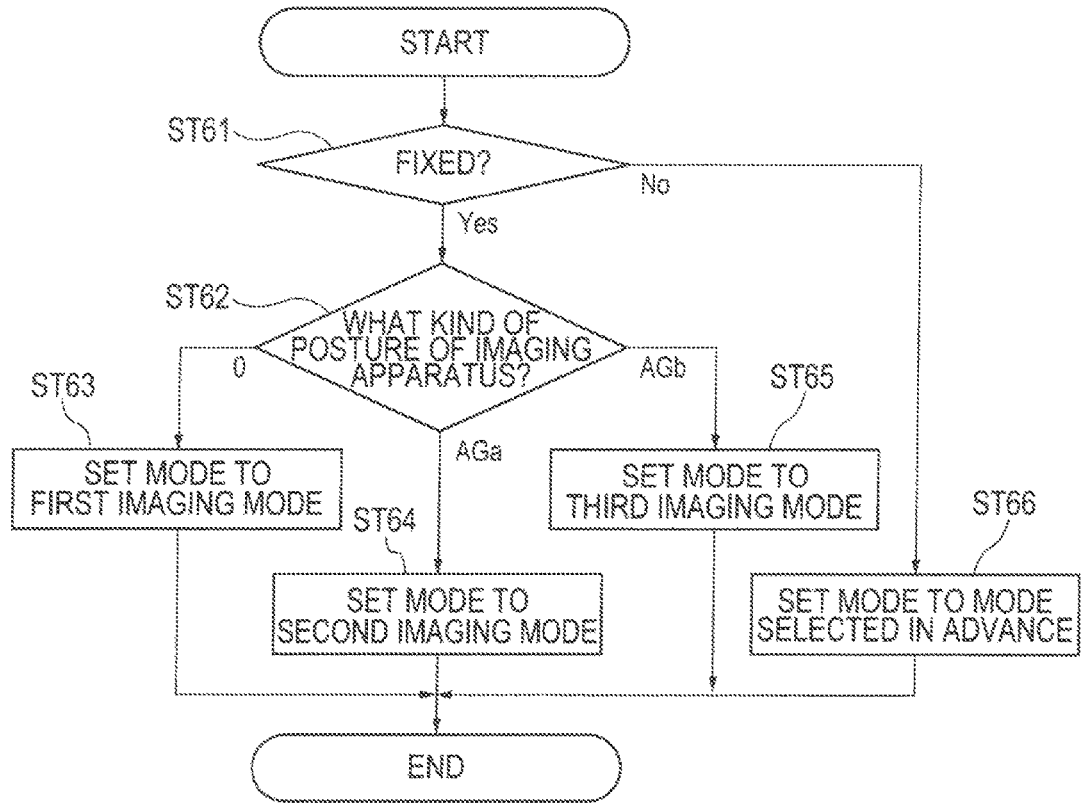
FIG. 13 is a flowchart illustrating processing in the case where second control operation is performed at the control unit of the imaging apparatus.

FIG. 13 is a flowchart illustrating processing in the case where the second control operation is performed at the control unit of the imaging apparatus.

In step ST61, the control unit 45 determines whether the imaging apparatus 20 and the information processing apparatus 60 are fixed. When the control unit 45 determines that the imaging apparatus 20 and the information processing apparatus 60 are fixed based on the fixation/separation information outputted from the fixation/separation determining unit 91, the processing proceeds to step ST62, while, when the control unit 45 determines that the imaging apparatus 20 and the information processing apparatus 60 are in a separation state, the processing proceeds to step ST66.

In step ST62, the control unit 45 determines posture of the imaging apparatus 20 fixed to the information processing apparatus 60. When the control unit 45 determines that the imaging apparatus 20 and the information processing apparatus 60 are in a fixation state in which a reference direction of the imaging apparatus 20 is the same as a reference direction of the information processing apparatus 60 based on the fixation relationship information outputted from the fixation relationship determining unit 92, the processing proceeds to step ST63. Further, when the control unit 45 determines that the imaging apparatus 20 and the information processing apparatus 60 are in a fixation state in which there is a difference of a predetermined angle AGa between the reference direction of the imaging apparatus 20 and the reference direction of the information processing apparatus 60, the processing proceeds to step ST64. Still further, when the control unit 45 determines that there is a difference of a predetermined angle AGb greater than the predetermined angle AGa between the reference direction of the imaging apparatus 20 and the reference direction of the information processing apparatus 60, the processing proceeds to step ST65.

In step ST63, the control unit 45 sets the mode relating to imaging to a first imaging mode. In step ST64, the control unit 45 sets the mode relating to imaging to a second imaging mode different from the first imaging mode. Further, in step ST65, the control unit 45 sets the mode relating to imaging to a third imaging mode different from the first imaging mode and the second imaging mode.

When the processing proceeds from step ST61 to step ST66, the control unit 45 sets the mode relating to imaging to a mode selected in advance through user operation, or the like. The control unit 45 sets the mode relating to imaging to the mode selected in advance, for example, a mode selected upon completion of previous operation or a mode selected through user operation at the operation input units 44 and 78.

Further, mode control operation may be performed at the control unit 85 of the information processing apparatus 60. In this case, the processing in step ST61 and 62 is performed at the control unit 85. Further, when the reference direction of the imaging apparatus 20 is the same as the reference direction of the information processing apparatus 60, the control unit 85 gives an instruction to set the mode relating to imaging to the first imaging mode. When there is a difference of the predetermined angle AGa between the reference direction of the imaging apparatus 20 and the reference direction of the information processing apparatus 60, the control unit 85 gives an instruction to set the mode relating to imaging to the second imaging mode. Further, when there is a difference of the predetermined angle AGb greater than the predetermined angle AGa between the reference direction of the imaging apparatus 20 and the reference direction of the information processing apparatus 60, the control unit 85 gives an instruction to set the mode relating to imaging to the third imaging mode. Still further, the control unit 45 of the imaging apparatus 20 sets the mode relating to imaging based on a setting instruction. It should be noted that the setting instruction is transmitted from the information processing apparatus 60 to the imaging apparatus 20 through radio communication.

Further, determination of the fixation relationship and mode control operation may be performed at separate apparatuses. For example, the fixation relationship determining unit 92 is provided at the information processing apparatus 60, and the fixation relationship information outputted from the fixation relationship determining unit 92 is transmitted to the imaging apparatus 20. The imaging apparatus 20 performs mode control based on the received fixation relationship information.

Figure 14:
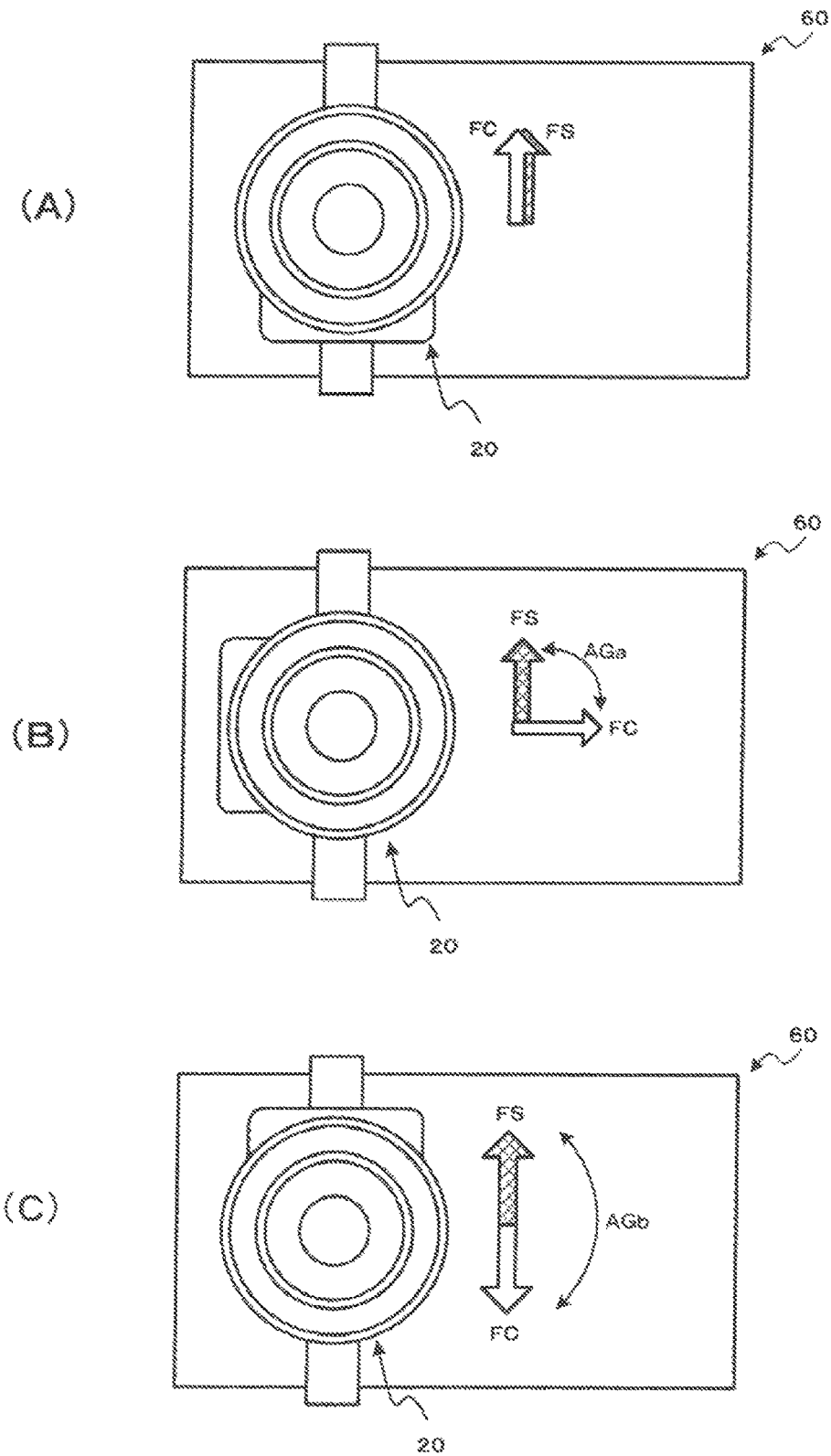
FIG. 14 is a diagram illustrating fixation relationship between the imaging apparatus and the information processing apparatus.

FIG. 14 illustrates the fixation relationship between the imaging apparatus and the information processing apparatus. It should be noted that in FIG. 14, an arrow FC indicates the reference direction of the imaging apparatus 20, and an arrow FS indicates the reference direction of the information processing apparatus. FIG. 14(A) illustrates a case where the reference direction of the imaging apparatus 20 is the same as the reference direction of the information processing apparatus 60. FIG. 14(B) illustrates a case where there is a difference of the predetermined angle AGa (for example, approximately 90 degrees) between the reference direction of the imaging apparatus 20 and the reference direction of the information processing apparatus 60. Further. FIG. 14(C) illustrates a case where there is a difference of the predetermined angle AGb (for example, approximately 180 degrees) between the reference direction of the imaging apparatus 20 and the reference direction of the information processing apparatus 60.

As illustrated in FIG. 14(A), when the imaging apparatus 20 and the information processing apparatus 60 are in a fixation state in which the reference direction of the imaging apparatus 20 is the same as the reference direction of the information processing apparatus 60, the control unit 45 controls each unit of the imaging apparatus 20 so that imaging is performed in the first imaging mode. In the first imaging mode, for example, a still image according to an imaging scene is generated. Specifically, a mode according to the imaging scene is automatically selected from a plurality of modes preset by the user, and each unit of the imaging apparatus 20 is controlled so as to pick up the still image in the automatically selected mode. It should be noted that the mode preset by the user may be a mode selected by the user from modes registered in advance upon shipment from the factory or a mode uniquely set by the user.

As illustrated in FIG. 14(B), when the imaging apparatus 20 and the information processing apparatus 60 are in a fixation state in which there is a difference of the predetermined angle AGa (for example, approximately 90 degrees) between the reference direction of the imaging apparatus 20 and the reference direction of the information processing apparatus 60, the control unit 45 controls each unit of the imaging apparatus 20 so that imaging is performed in the second imaging mode different from the first imaging mode. In the second imaging mode, for example, a still image is generated using continuously picked up images. Specifically, each unit of the imaging apparatus 20 is controlled so as to generate a still image which is a composite image composed from the continuously picked up images and subjected to noise and camera-shake reduction processing, backlight correction, or the like.

Further, when the imaging apparatus 20 and the information processing apparatus 60 are in a fixation state in which there is a difference of the predetermined angle AGb (for example, 180 degrees) between the reference direction of the imaging apparatus 20 and the reference direction of the information processing apparatus 60, the control unit 45 controls each unit of the imaging apparatus 20 so that imaging is performed in the third imaging mode different from the first and the second imaging modes. In the third imaging mode, for example, a moving image is generated.

Further, the relationship between the above-described fixation relationship between the imaging apparatus and the information processing apparatus and the mode relating to imaging is an example, and other modes may be set according to the fixation relationship. For example, it is assumed that, when the reference direction of the imaging apparatus 20 is the same as the reference direction of the information processing apparatus 60 as illustrated in FIG. 14(A), a longitudinal direction of the picked up image generated at the imaging apparatus 20 is equal to a longitudinal direction of the displayed image of the information processing apparatus 60. In this case, when an image of landscape, or the like, is picked up in such a manner that the longitudinal direction of the picked up image becomes a horizontal direction, at the information processing apparatus 60, the image of landscape, or the like, is displayed in such a manner that the longitudinal direction of the displayed image becomes the horizontal direction. That is, because this case corresponds to a horizontal placement state, the control unit 45 sets the mode relating to imaging to, for example, a landscape mode and controls each unit of the imaging apparatus 20 so that operation appropriate for imaging of a still image such as landscape is performed. Further, it is assumed that, when there is a difference of the predetermined angle AGa (for example, approximately 90 degrees) between the reference direction of the imaging apparatus 20 and the reference direction of the information processing apparatus 60 as illustrated in FIG. 14(B), a short width direction of the picked up image generated at the imaging apparatus 20 is equal to the longitudinal direction of the displayed image of the information processing apparatus 60. In this case, when an image of a person, or the like, is picked up in such a manner that the longitudinal direction of the picked up image becomes the horizontal direction, at the information processing apparatus 60, the image of the person, or the like, is displayed in such a manner that the longitudinal direction of the displayed image becomes the vertical direction. That is, because this case corresponds to a vertical placement state, the control unit 45 sets the mode relating to imaging to, for example a portrait mode and controls each unit of the imaging apparatus 20 so that operation appropriate for imaging of a still image such as a person is performed.

Further, control operation performed in the first to the third imaging modes may be set in advance or may be freely set by the user.

As described above, in the second control operation, the mode relating to imaging is set according to the fixation relationship of the imaging apparatus 20 fixed to the information processing apparatus 60. Therefore, it is possible to set the mode of the imaging apparatus 20 to a desired mode only by fixing the imaging apparatus 20 to the information processing apparatus 60 so that imaging apparatus 20 has desired fixation relationship with the information processing apparatus 60. Accordingly, it is possible to eliminate the necessity of troublesome setting operation for setting the mode relating to imaging of the imaging apparatus 20 to a desired mode.

[5-2-3. Third Control Operation]

Third control operation of the mode relating to imaging will be described next. In the third control operation, a case will be described where when the imaging apparatus and the information processing apparatus are put into a fixation state, the mode relating to imaging is controlled according to whether a plurality of imaging apparatuses, for example, two imaging apparatuses are fixed on the same face of the information processing apparatus.

Figure 15:
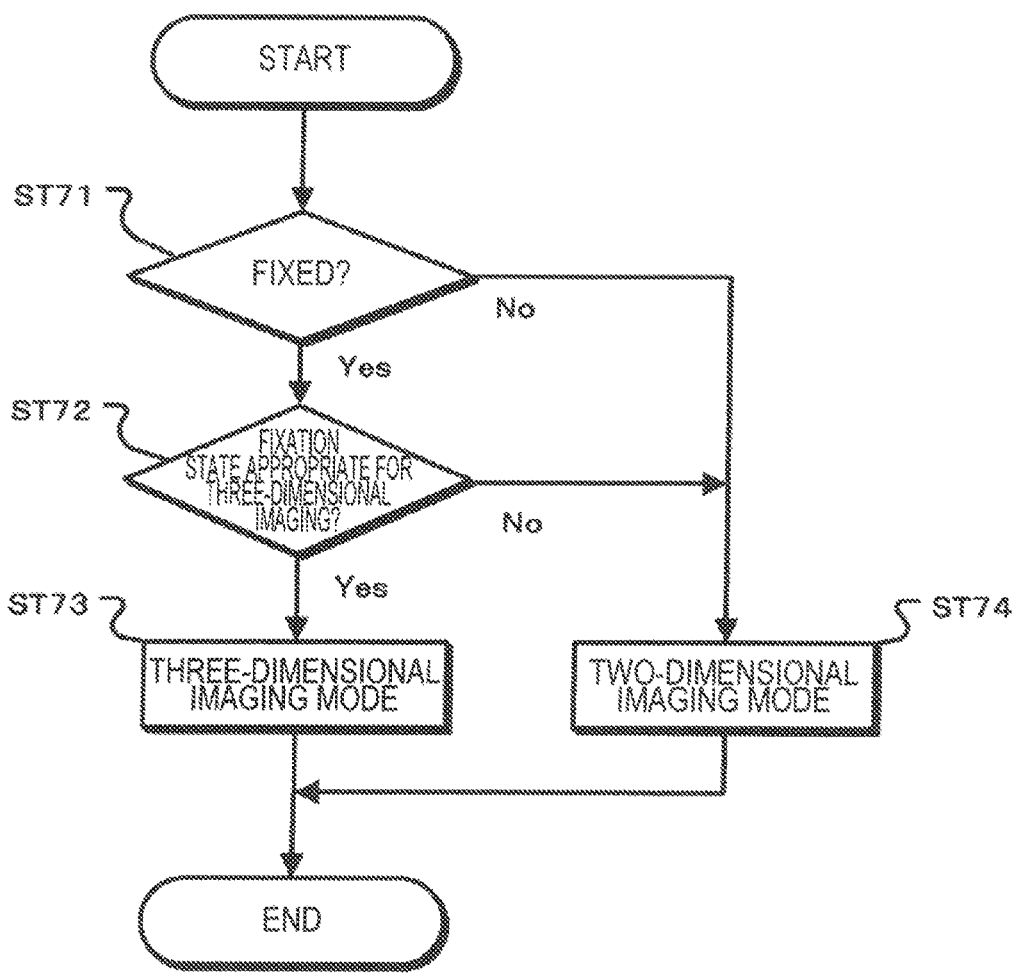
FIG. 15 is a flowchart illustrating processing in the case where third control operation is performed at the control unit of the imaging apparatus.

FIG. 15 is a flowchart illustrating processing in the case where the third control operation is performed at the control unit of the imaging apparatus.

In step ST71, the control unit 45 determines whether the imaging apparatus 20 and the information processing apparatus 60 are fixed. When the control unit 45 determines that the imaging apparatus 20 and the information processing apparatus 60 are fixed based on the fixation/separation information outputted from the fixation/separation determining unit 91, the processing proceeds to step ST72, while, when the control unit 45 determines that the imaging apparatus 20 and the information processing apparatus 60 are in a separation state, the processing proceeds to step ST74.

In step ST72, the control unit 45 determines whether the imaging apparatus 20 and the information processing apparatus 60 are in a fixation state appropriate for three-dimensional imaging. For example, when information indicating that other imaging apparatuses are fixed on the same face side is supplied from the information processing apparatus 60, the control unit 45 determines that the other imaging apparatuses and the information processing apparatus 60 are in the fixation state in which three-dimensional imaging is possible, and the processing proceeds to step ST73. Further, when the control unit 45 does not determine that other imaging apparatuses are fixed on the same face side, the processing proceeds to step ST74.

In step ST73, the control unit 45 sets the mode relating to imaging to a three-dimensional imaging mode. In the three-dimensional imaging mode, picked up images with different viewpoints are generated at a plurality of imaging apparatuses. Therefore, the control unit 45 performs control so that imaging operation which is the same as that of other imaging apparatuses is performed. For example, the control unit 45 generates picked up images with viewpoints different from each other while making timings at which imaging is started or finished, a zoom position, diaphragm, focus control, image processing, or the like, the same as those of other imaging apparatuses.

In step ST74, the control unit 45 sets the mode relating to imaging to a two-dimensional imaging mode. In the two-dimensional imaging mode, other imaging apparatuses individually generate picked up images. Therefore, even when the control unit 45 determines that other imaging apparatuses are fixed to the information processing apparatus 60, each imaging apparatus independently performs generation of a picked up image, or the like. Further part of control of a timing, or the like, may be made the same among the imaging apparatuses.

Further, mode control operation may be performed at the control unit 85 of the information processing apparatus 60. In this case, processing in step ST71 and 72 is performed at the control unit 85. When the control unit 85 determines that two imaging apparatuses are fixed on the same face side of the information processing apparatus 60, the control unit instructs each imaging apparatus to make the mode relating to imaging transition to the three-dimensional imaging mode. Further, when the control unit 85 does not determine that two imaging apparatuses are fixed on the same face side of the information processing apparatus 60, the control unit instructs the imaging apparatus to make the mode relating to imaging transition to the two-dimensional imaging mode.

Figure 16:
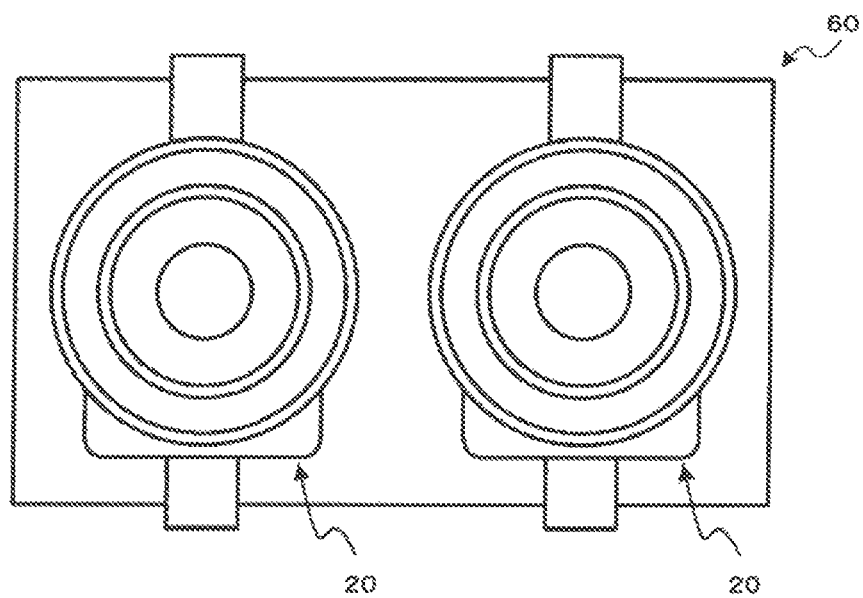
FIG. 16 is a diagram illustrating a case where two imaging apparatuses are fixed on a back side of the information processing apparatus.

Further, in the third control operation, it is also possible to set the mode to the three-dimensional imaging mode when there is a predetermined interval among the plurality of imaging apparatuses. For example, an interval among the imaging apparatuses can be set greater in the case where a tablet terminal is used as the information processing apparatus 60 than the case where a smartphone is used as the information processing apparatus 60. Therefore, the interval among the imaging apparatuses is different between in the case where the table terminal is used and the case where the smartphone is used, and three-dimensional images with different disparity are generated. Therefore, whether or not the plurality of imaging apparatuses and the information processing apparatus 60 are in a fixation state in which three-dimensional imaging is possible is determined also taking into account the interval among the plurality of imaging apparatuses fixed on the same face side of the information processing apparatus 60. For example, as illustrated in FIG. 16, when two imaging apparatuses 20 are fixed on the back side of the information processing apparatus 60 at a desired interval, the processing proceeds to step ST73, while, when the interval is less or greater than the desired interval, the processing proceeds to step ST74. Whether the plurality of imaging apparatuses are fixed on the same face of the information processing apparatus 60 can be determined based on the fixation/separation information and the fixation relationship information. Further, the interval among the imaging apparatuses 20 may be determined by a distance measurement sensor provided at, for example, the imaging apparatus 20 and the attachment mechanism portion 50. Further, it is also possible to determine that an adapter which can fix the plurality of imaging apparatuses to the information processing apparatus 60 at desired intervals is used. Still further, it is also possible to estimate disparity at the information processing apparatus 60 based on the picked up images from the plurality of fixed imaging apparatuses 20 and determine that the plurality of imaging apparatuses and the information processing apparatus 60 are in a fixation state in which three-dimensional imaging is possible when the estimation result indicates desired disparity. Further, when the desired interval is set based on an interval between both eyes, and the imaging apparatuses are fixed at the desired intervals, by setting the mode to the three-dimensional imaging mode, disparity will not become too small between images with a plurality of viewpoints due to the interval being too small, or will not become too great between the images with the plurality of viewpoints due to the interval being too large. Accordingly, it is possible to realize comfortable stereoscopic view.

As described above, in the third control operation, the mode is set to the three-dimensional imaging mode or the two-dimensional imaging mode according to the fixation relationship of the imaging apparatus 20 fixed to the information processing apparatus 60. Therefore, it is possible to pick up a three-dimensional image only by fixing a plurality of imaging apparatuses 20 to the information processing apparatus 60, and it is possible to eliminate the necessity of troublesome operation for individually setting the modes relating to imaging of the plurality of imaging apparatuses 20 to generate picked up images with respective viewpoints.

Incidentally, a series of the processes described in the present specification can be executed by hardware, software, or a combination of both. The software can execute the processes by installing a program recording a processing sequence into a memory in a computer integrated with dedicated hardware, or by installing the program in a general purpose computer executable of various processes. For example, the program can previously be recorded in a hard disk drive, SSD (Solid State Drive), or ROM (Read Only Memory) as a recording medium. Or the program can temporarily or permanently be stored (recorded) in a removable medium such as a flexible disk, CD-ROM (Compact Disc Read Only Memory), MO (Magneto optical) disk, DVD (Digital Versatile Disc), BD (Blu-Ray Disc (registered trademark)), magnetic disk, semiconductor memory card. Such a removable recording medium can be provided as so-called packaged software.

Moreover, the program not only be installed in the computer form the removable recording medium but also may be installed by wireless or wired transferring into the computer via a network such as a LAN (Local Area Network) and the Internet from download sites. The computer can undergo installation of the received program, which is transferred like that, into the recording medium such as the mounted hard disk drive.

The present technology is not interpreted as being limited to the above-described embodiments of the technology. The embodiments of the technology disclose the present technology in the form of exemplification, and it is obvious that a person skilled in the art can make modification or substitution of the embodiments without departing from the gist of the present technology. In other words, in order to determine the gist of the present technology, the claims should be considered.

Additionally, the imaging system according to the present technology may also be configured as below.

(1)

An imaging system including:

a control unit configured to control a mode relating to imaging of an imaging apparatus according to fixation relationship information indicating fixation relationship between the imaging apparatus and an information processing apparatus in a fixation state in which the imaging apparatus and the information processing apparatus are fixed to each other.

(2)

The imaging system according to (1), wherein the imaging apparatus and the information processing apparatus are switchable between the fixation state and a separation state in which the imaging apparatus and the information processing apparatus are separated from each other.

(3)

The imaging system according to (1) or (2), further including:

a fixation/separation determining unit configured to determine whether the imaging apparatus and the information processing apparatus are in the fixation state or the separation state.

(4)

The imaging system according to any of (1) to (3), wherein the control unit does not perform control of the mode relating to imaging when the imaging apparatus and the information processing apparatus are in the separation state.

(5)

The imaging system according to any of (1) to (4), further including:

a fixation relationship determining unit configured to determine the fixation relationship and output the fixation relationship information.

(6)

The imaging system according to any of (1) to (5), wherein the information processing apparatus includes a display unit on one face of a chassis, and wherein the control unit controls the mode of the imaging apparatus to a self-capturing mode when the fixation relationship information indicates that the imaging apparatus is fixed on a side of the display unit of the information processing apparatus.

(7)

The imaging system according to (6), wherein the control unit displays a mirror-reversed picked up image at the display unit in the self-capturing mode.

(8)

The imaging system according to any of (1) to (7), wherein the control unit controls the mode of the imaging apparatus to modes different from each other between a case where the fixation relationship information indicates that the imaging apparatus is fixed to the information processing apparatus in a first fixation state and a case where the fixation relationship information indicates that the imaging apparatus is fixed in a second fixation state in which the imaging apparatus is rotated from the first fixation state by a predetermined angle based on an optical axis direction of an optical imaging system of the imaging apparatus.

(9)

The imaging system according to (8), wherein the modes different from each other include a still image pickup mode and a moving image pickup mode.

(10)

The imaging system according to (8), wherein the modes different from each other include a still image pickup mode in which a still image is generated according to an imaging scene and a still image pickup mode in which a still image is generated from continuously picked up images.

(11)

The imaging system according to (8), wherein the modes different from each other include a landscape mode and a portrait mode.

(12)

The imaging system according to (8), wherein the predetermined angle in the rotation is approximately 90 degrees or approximately 180 degrees.

(13)

The imaging system according to any of (1) to (12), wherein when the fixation relationship information indicates that a plurality of the imaging apparatuses are held on one face of a chassis of the information processing apparatus, the control unit controls modes of the imaging apparatuses to modes for generating picked up images with viewpoints different among the plurality of imaging apparatuses.

(14)

The imaging system according to any of (1) to (13), wherein the imaging apparatus does not have a function for displaying a picked up image generated through the imaging, and wherein the information processing apparatus displays a picked up image obtained at the imaging apparatus through communication between the imaging apparatus and the information processing apparatus.

(15)

The imaging system according to any of (1) to (14), wherein in control of the mode relating to imaging, a mode set in advance by a user is selected according to the fixation relationship information.

INDUSTRIAL APPLICABILITY

In the present technology, the mode relating to imaging of the imaging apparatus is controlled according to the fixation relationship information indicating the fixation relationship between the imaging apparatus and the information processing apparatus in a fixation state in which the imaging apparatus and the information processing apparatus are fixed to each other. Therefore, because the mode is set according to the fixation relationship information without troublesome operation for setting the mode being performed at the imaging apparatus or the information processing apparatus, it is possible to easily set the mode relating to imaging. Accordingly, the present technology is suitable for an imaging system in which the imaging apparatus which does not have a display function can be fixed to the information processing apparatus such as a smartphone, communication is performed between the imaging apparatus and the information processing apparatus, and, for example, a picked up image generated at the imaging apparatus can be confirmed at the information processing apparatus.

REFERENCE SIGNS LIST 10 imaging system
15 control unit
20 imaging apparatus
21 cylindrical portion
22 control ring
31 optical imaging system
32 imaging unit
33 image processing unit
34, 74 recording and reproducing unit
35, 75 power supply unit
36, 76 sensor unit
37, 73 storage unit
38, 77 display unit
41, 71 radio communication unit
44, 78 operation input unit
45, 85 control unit
46, 86 recording medium
50 attachment mechanism portion
51, 52 attachment member
60 information processing apparatus
61 chassis
62 display panel
72 sound input/output unit
91 fixation/separation determining unit
92 fixation relationship determining unit
441 zoom button
442 shutter button

The invention claimed is:

1. An imaging system, comprising:
an imaging apparatus;
a brightness detection sensor attached to a surface of the imaging apparatus;
an information processing apparatus; and
circuitry configured to:
determine fixation relationship information based on an output of the brightness detection sensor, wherein the fixation relationship information indicates the imaging apparatus is fixed on one of a front side or a back side of the information processing apparatus; and
set an imaging mode of the imaging apparatus based on the determined fixation relationship information.

2. The imaging system according to claim 1,
wherein the imaging apparatus and the information processing apparatus are switchable between a fixation state and a separation state,
wherein the fixation state indicates that the imaging apparatus is fixed to the information processing apparatus, and
wherein the separation state indicates that the imaging apparatus is separated from the information processing apparatus.

3. The imaging system according to claim 2, wherein the circuitry is further configured to determine the imaging apparatus and the information processing apparatus are in one of the fixation state or the separation state based on fixation/separation information.

4. The imaging system according to claim 3, wherein the circuitry is further configured to control a setting process of the imaging mode based on the determination that the imaging apparatus and the information processing apparatus are in the separation state.

5. The imaging system according to claim 1,
wherein the information processing apparatus includes a display screen on one face of a chassis, and
wherein the circuitry is further configured to set the imaging mode of the imaging apparatus to a self-capturing mode based on the fixation relationship information that indicates that the imaging apparatus is fixed on a display screen side of the information processing apparatus.

6. The imaging system according to claim 5, wherein the circuitry is further configured to display a mirror-reversed picked up image at the display screen in the self-capturing mode.

7. The imaging system according to claim 1,
wherein the circuitry is further configured to set the imaging mode based on posture information of the imaging apparatus,
wherein the imaging apparatus is fixed to the information processing apparatus, and
wherein the posture information indicates an angular difference between a reference direction of the imaging apparatus and a reference direction of the information processing apparatus.

8. The imaging system according to claim 7, wherein the imaging mode includes one of a still image pickup mode or a moving image pickup mode.

9. The imaging system according to claim 7, wherein the imaging mode includes one of a first still image pickup mode in which a first still image of an imaging scene is generated or a second still image pickup mode in which a second still image is generated from continuously picked up images.

10. The imaging system according to claim 7, wherein the imaging mode includes one of a landscape mode or a portrait mode.

11. The imaging system according to claim 7, wherein the angular difference is one of a 0 degrees, 90 degrees, or 180 degrees.

12. The imaging system according to claim 1, further comprising a plurality of imaging apparatuses, wherein the circuitry is further configured to set modes of the plurality of imaging apparatuses to a first mode based on the fixation relationship information that indicates that the plurality of the imaging apparatuses are held on one face of a chassis of the information processing apparatus,
wherein the imaging apparatus is included in the plurality of the imaging apparatuses, and
wherein in the first mode, each imaging apparatus of the plurality of the imaging apparatuses generates picked up images with different viewpoints.

13. The imaging system according to claim 1,
wherein the imaging apparatus is configured to generate a picked up image based on the set imaging mode,
wherein the imaging apparatus is further configured to transmit the picked up image to the information processing apparatus via a communication link, and
wherein the information processing apparatus is configured to display a received picked up image.

14. The imaging system according to claim 1, wherein the circuitry is further configured to set the imaging mode to a preset mode based on the fixation relationship information.

15. An imaging system, comprising:
an imaging apparatus;
a brightness detection sensor attached to a surface of the imaging apparatus;
an information processing apparatus; and
circuitry configured to:
determine fixation relationship information based on an output of the brightness detection sensor, wherein the fixation relationship information indicates the imaging apparatus is fixed on one of a front side or a back side of the information processing apparatus;
generate and display a notification based on the determined fixation relationship information, wherein the generated and displayed notification indicates a suggestion to select a specific imaging mode of the imaging apparatus;
receive a user instruction based on the generated and displayed notification; and
set a imaging mode of the imaging apparatus based on the received user instruction.

16. An imaging control method, comprising:
determining fixation relationship information based on an output of a brightness detection sensor, wherein the fixation relationship information indicates an imaging apparatus is fixed on one of a front side or a back side of an information processing apparatus, and wherein the brightness detection sensor is attached to a surface of the imaging apparatus; and
setting an imaging mode of the imaging apparatus based on the determined fixation relationship information.

17. A non-transitory computer-readable medium having stored thereon computer-readable instructions, which when executed by a computer, cause the computer to execute operations, the operations comprising:
determining fixation relationship information based on an output of a brightness detection sensor, wherein the fixation relationship information indicates an imaging apparatus is fixed on one of a front side or a back side of an information processing apparatus, wherein the brightness detection sensor is attached to a surface of the imaging apparatus; and
setting an imaging mode of the imaging apparatus based on the determined fixation relationship information.

18. An imaging apparatus, comprising:
circuitry configured to:
determine fixation relationship information based on an output of a brightness detection sensor, wherein the fixation relationship information indicates the imaging apparatus is fixed on one of a front side or a back side of an information processing apparatus, wherein the brightness detection sensor is attached to a surface of the imaging apparatus; and
set an imaging mode based on the determined fixation relationship information.

19. The imaging apparatus according to claim 18,
wherein the circuitry is configured to:
generate a picked up image based on the set imaging mode,
transmit the picked up image to the information processing apparatus via a communication link, and
wherein the information processing apparatus displays a received picked up image.

20. The imaging apparatus according to claim 18, wherein the circuitry is further configured to:
communicate with the information processing apparatus via a communication link;
generate the fixation relationship information that indicates that the imaging apparatus is fixed on one of the front side or the back side of the information processing apparatus;

transmit, via the communication link, the fixation relationship information to the information processing apparatus; and set the imaging mode based on a control signal that is received from the information processing apparatus.

21. An information processing apparatus, comprising:

circuitry configured to:

communicate with an imaging apparatus via a communication link;

receive, from the imaging apparatus, fixation relationship information, wherein the fixation relationship information indicates the imaging apparatus is fixed on one of a front side or a back side of the information processing apparatus, wherein the fixation relationship information is determined based on an output of a brightness detection sensor, and wherein the brightness detection sensor is attached to a surface of the imaging apparatus; and set, via the communication link, an imaging mode of the imaging apparatus based on the received fixation relationship information.

22. The information processing apparatus according to claim 21, wherein the circuitry is further configured to:

receive, via the communication link, the fixation relationship information;

generate a control signal based on the received fixation relationship information from the imaging apparatus; and transmit, via the communication link, the generated control signal to the imaging apparatus to set the imaging mode of the imaging apparatus.

23. The information processing apparatus according to claim 21, wherein the circuitry is further configured to:

receive, via the communication link, a picked up image from the imaging apparatus; and display the received picked up image on a display screen.

* * * * *